US006546443B1

(12) United States Patent
Kakivaya et al.

(10) Patent No.: US 6,546,443 B1
(45) Date of Patent: Apr. 8, 2003

(54) CONCURRENCY-SAFE READER-WRITER LOCK WITH TIME OUT SUPPORT

(75) Inventors: Gopala Krishna R. Kakivaya, Redmond, WA (US); David N. Cutler, Medina, WA (US); James M. Lyon, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/465,239

(22) Filed: Dec. 15, 1999

(51) Int. Cl.[7] .................. G06F 13/376; G06F 12/00
(52) U.S. Cl. .................. 710/200; 710/108; 714/15
(58) Field of Search .................. 710/200, 108; 711/145, 151, 152, 163; 709/101, 102, 104, 107, 229, 232, 248, 400; 707/8–10, 1, 201; 714/2, 15

(56) References Cited

U.S. PATENT DOCUMENTS

| | | | |
|---|---|---|---|
| 5,274,809 A | * | 12/1993 | Iwasaki et al. |
| 5,502,840 A | * | 3/1996 | Barton |
| 5,774,731 A | * | 6/1998 | Higuchi et al. |
| 5,884,316 A | | 3/1999 | Bernstein et al. |
| 6,029,190 A | * | 2/2000 | Oliver |
| 6,167,423 A | | 12/2000 | Chopra et al. |

OTHER PUBLICATIONS

"OLE Controls: Understanding Events," MSDN CD–ROM, Microsoft Corporation, pp. 1–8, Apr. 1998.
"Hierarchy Chart," MSDN CD–ROM, Microsoft Corporation, pp. 1–5, Apr. 1998.
"Microsoft Foundation Class Library Version 4.2," MSDN CD–ROM, Microsoft Corporation, pp. 1–5, Apr. 1998.
Schmidt, "Evaluating Architectures for Multithreaded Object Request Brokers," *Communications of the ACM*, vol. 41, No. 10, pp. 54–60, Oct. 1998.
"Multithreading: How to Use the Synchronization Classes," MSDN CD–ROM, Microsoft Corporation, pp. 1–2, Apr. 1998.
"CEvent," MSDN CD–ROM, Microsoft Corporation, pp. 1–2, Apr. 1998.
"OpenEvent," MSDN CD–ROM, Microsoft Corporation, pp. 1–2, Apr. 1998.
"Synchronization Functions," MSDN CD–ROM, Microsoft Corporation, p. 1, Apr. 1998.
"CreateEvent," MSDN CD–ROM, Microsoft Corporation, pp. 1–2, Apr. 1998.
Kleiman et al., *Programming with Threads*, SunSoft Press, pp. 248–253, 1996, pp. 259–260, pp. 273–274.

(List continued on next page.)

*Primary Examiner*—Gopal C. Ray
(74) *Attorney, Agent, or Firm*—Klarquist Sparkman, LLP

(57) ABSTRACT

Synchronization services provide a concurrency-safe reader/writer lock supporting a time out feature. The lock can be implemented using lockless data structures to provide efficient synchronization services. Various features such as lock nesting and auto-transformation address common scenarios arising in componentized programs. The lock supports upgrading and suspension, and the time out feature can support an efficient, low-cost optimistic deadlock avoidance scheme. Peculiarities of the reader/writer scenario are addressed in an efficient way to maintain lock stability and consistency, thus providing synchronization services suitable for implementation at the kernel level. In one implementation using event objects, the events are managed for high efficiency and stability of the lock. For multiprocessor machines, a hybrid lock avoids a context switch by behaving as a spin lock before waiting for the lock to become available.

73 Claims, 14 Drawing Sheets

OTHER PUBLICATIONS

Lewis et al., *Threads Primer: A Guide to Multithreaded Programming*, SunSoft Press, pp. 65–72, 1996, pp. 87–96, p. 117, p. 205, pp. 224–227.

Deitel and Deitel, *Java How to Program*, Prentice Hall, Second Edition, pp. 688–729, 1998.

Microsoft Corporation, "database.c," sample file from *Visual C++ 2.0*, Dec. 1993.

Microsoft Corporation, "readwrit.c," sample file from *Visual C++ 2.0*, Dec. 1993.

Microsoft Corporation, Read/Write Synchronization Demonstration, excerpt from help *Visual C++ 2.0*, Dec. 1993.

"semaphore.lock," *DocServer.UserLand.Com* website, http://docserver.userland.com/semaphore/lock, Nov. 2, 1999.

"synch.h," *Victoria University School of Mathematical and Computing Sciences* website, http://www.mcs.vuw.ac.nz/courses/COMP305/Nachos/nachos_html/synch_h.html, Nov. 2, 1999.

"lockd–network lock daemon," *Hewlett–Packard Company* website, http://www.software.hp.com/STK/man/11.00/lockd_1m.html, Oct. 1997.

Agrawal et al., "Integrated Concurrency Control and Recovery Mechanisms: Design and Performance Evaluation," *ACM Transactions on Database Systems*, vol. 10, No. 4, pp. 529–564, Dec. 1985.

Rekesh, *Issues in Concurrent Programming*, California Software Laboratories White Paper, pp. 1–31, http://www.cswl.com/whiteppr/white/concurrent.html, Sep. 23, 1998.

Kleiman et al., "Writing Multithreaded Code in Solaris," SunSoft, Inc., Mountain View, California, pp. 1–6, Dec. 1992.

"SetEvent," MSDN CD–ROM, Microsoft Corporation, p. 1, Apr. 1998.

"WaitForSingleObject," MSDN CD–ROM, Microsoft Corporation, pp. 1–2, Apr. 1998.

Schneider, *On Concurrent Programming*, Springer–Verlag New York, Inc., p. 2, 1997, pp. 198–202, pp. 308–335, pp. 337–376.

"Interface ReadWriteLock," http://g.oswego.edu/dl/classes/EDU/oswego/cs/dl/util/concurrent/ReadWriteLock.html, pp. 1–2, Jun. 7, 1999.

Frost, "Portable Thread Synchronization Using C++," *Software Tool & Die*, http://world.std.com/~jimf/papers/c++sync/c++sync.html, pp. 1–6, Jun. 7, 1999.

"Readers/Writers Problem," http://www.cs.umd.edu/~hollings/cs412/s96/synch/synch1.html, pp. 1–2, Jun. 7, 1999.

Christopher, "Animation of Multiple Readers/Writers Algorithms," http://toolsofcomputing.com/multiplereaderswriters.htm. pp. 1–5, Jun. 7, 1999.

Herlihy, "Wait–Free Synchronization," *ACM Transactions on Programming Languages and Systems*, vol. 11, No. 1, pp. 124–149, Jan. 1991.

"Parallel Programming—Basic Theory for the Unwary," http://www.actcom.co.il/~choo/lupg/tutorials/parallel–progr.../parallel–programming–theory.htm, pp. 1–10, Jun. 21, 1999.

"Multithreading: When to Use the Synchronization Classes," MSDN CD–ROM, Microsoft Corporation, pp. 1–2, Apr. 1998.

"CSemaphore," MSDN CD–ROM, Microsoft Corporation, pp. 1–2, Apr. 1998.

Valois, "Lock–Free Linked Lists Using Compare–and–Swap," *Proceedings of the 14th Annual ACM Symposium on Principles of Distributed Computing*, Ottawa, Ontario, Canada, pp. 214–222, 1995.

Anderson, "Wait–free Parallel Algorithms for the Union–Find Problem," *Communications of the ACM*, pp. 370–380, 1991.

Anderson, *Multiple Processing A Systems Overview*, Prentice Hall International Ltd., pp. 330–340, 1989.

"AIX Version 4.3 General Programming Concepts: Writing and Debugging Programs," http://www.cs.stedwards.edu/a_doc_lib/aixprggd/genprogc/create_locking_svcs.htm, pp. 1–3, Jun. 1, 1999.

Moir, "Practical Implementations of Non–Blocking Synchronization Primitives," *PODC 1997*, pp. 219–228, 1997.

"Threads Support Code," http://goya.inescn.pt/~avs/dot-Noweb/support/current/threads.red.html, pp. 1–11, Jun. 1, 1999.

"AIX Version 4.3 Base Operating System and Extensions Technical Reference, vol. 1," http://www.cs.stedwards.edu/a_doc_lib/libs/basetrf1/compare_and_swap.htm, pp. 1–2, Jun. 1, 1999.

Dietz, "Linux Parallel Procesing Using SMP," http://suparum.rz.uni-mannheim.de/Linux/parallel/ppsmp.html, pp. 1–9, Jun. 1, 1999.

Birrell, "An Introduction to Programming with Threads," Digital Systems Research Center, pp. 1–33, Jan. 6, 1989.

Adya et al., "Efficient Optimistic Concurrency Control Using Loosely Synchronized Clocks," *SIGMOD '95 Proceedings*, San Jose, CA, 1995.

Hsu et al., "Buses," *The Computer Science and Engineering Handbook*, Tucker (ed.), CRC Press, Inc., pp. 440, 1997.

Franklin, "Concurrency Control and Recovery," *The Computer Science and Engineering Handbook*, Tucker (ed.), CRC Press, Inc., pp. 1058–1076, 1997.

Wills, "Process Synchronization and Interprocess Communication," *The Computer Science and Engineering Handbook*, Tucker (ed.), CRC Press, Inc., pp. 1725–1746, 1997.

Bernat, "Concurrent/Distributed Computing Paradigm," *The Computer Science and Engineering Handbook*, Tucker (ed.), CRC Press, Inc., pp. 2094–2119, 1997.

"Guide to DECthreads," Digital Equipment Corporation, Maynard, MA, pp. iii–Glossary–8, Dec. 1997.

Mellor–Crummey et al., "Scalable Reader–Writer Synchronization for Shared–Memory Multiprocessors," *Communications of the ACM*, pp. 106–113, 1991.

"Class Reentrant WritePreferenceReadWriteLock," SUNY Oswego website, http://g.oswego.edu/dl/classes/EDU/oswego/cs/dl/util/concurrent/ReentrantWriter–PreferenceReadWriteLock.htm, Jun. 7, 1999.

Massalin et al., "A Lock–Free Multiprocessor OS Kernel," Columbia University Computer Science Technical Report No. CUCS–005–91, pp. 1–19, Jun. 19, 1991.

* cited by examiner

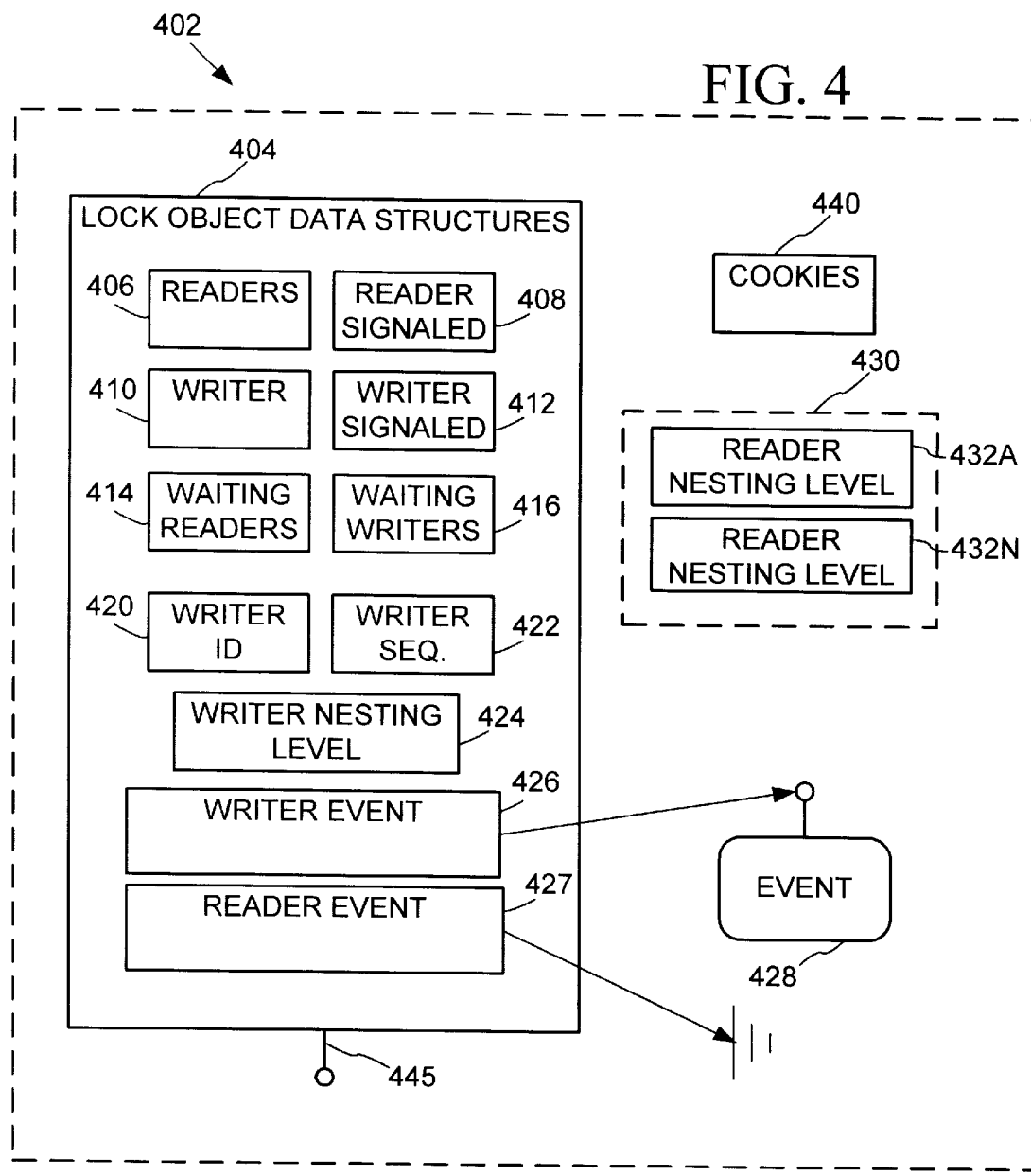
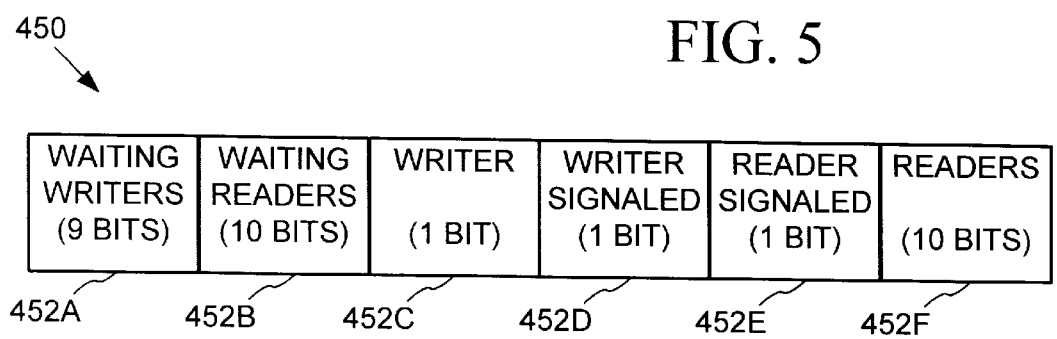

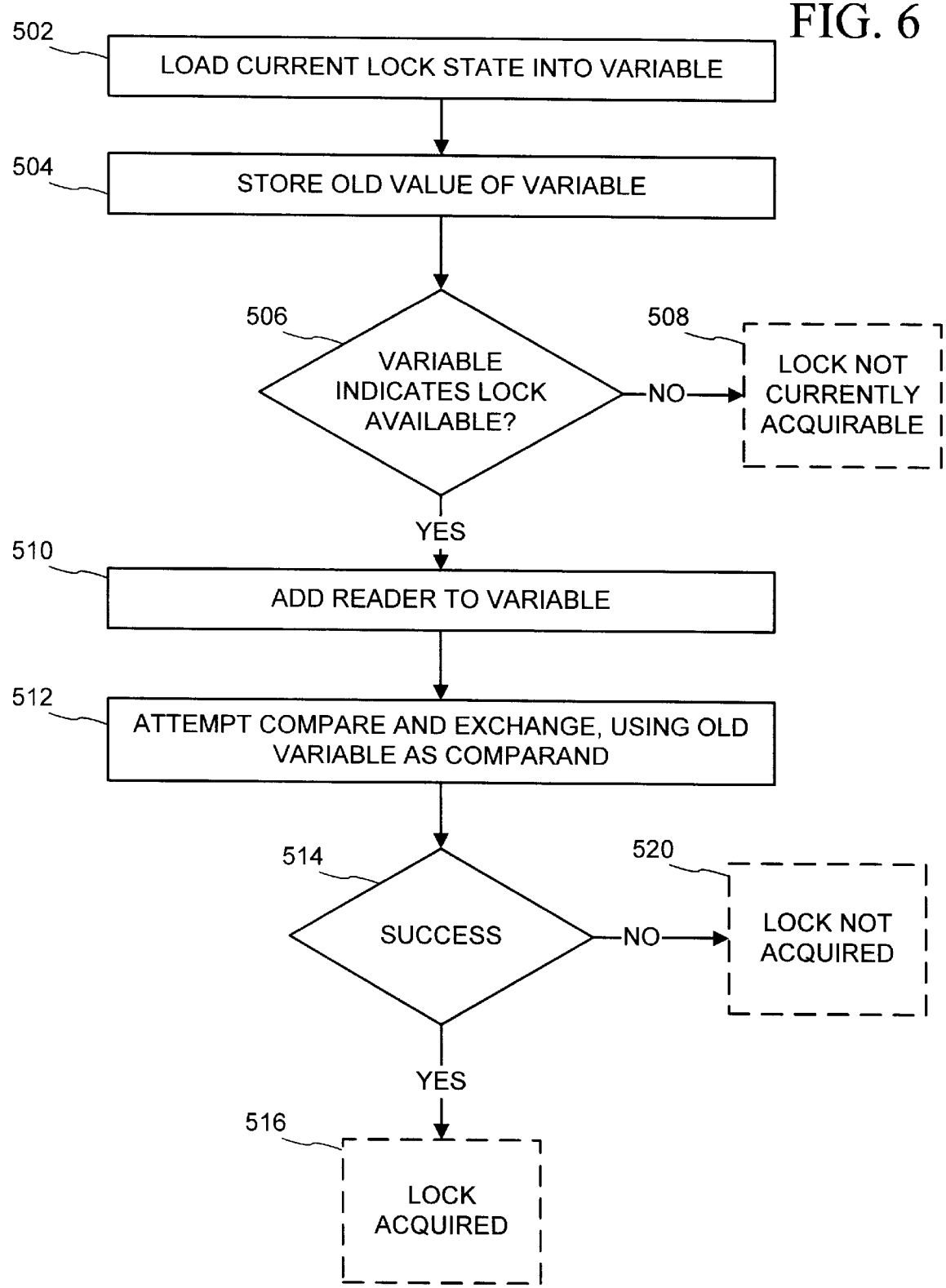

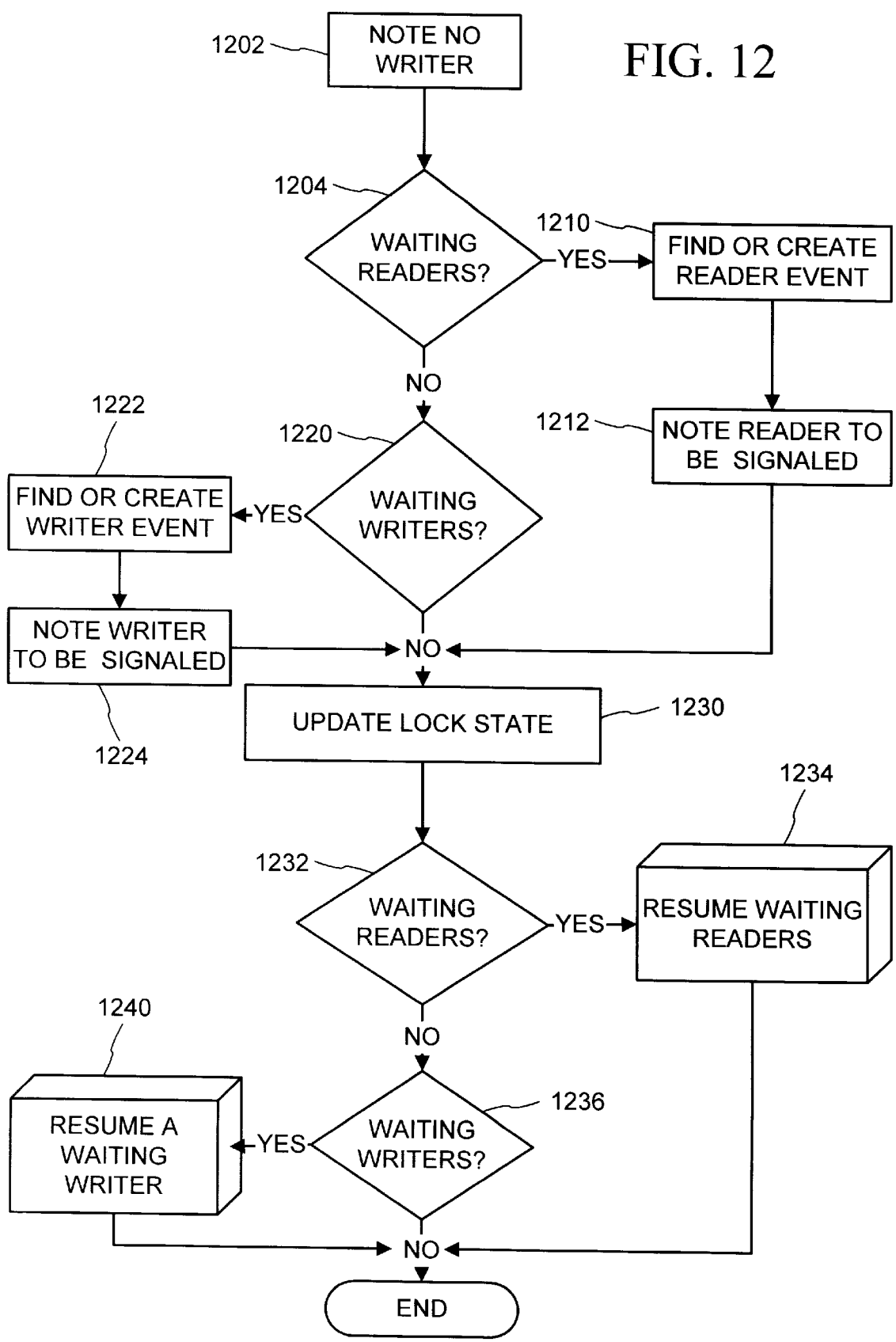

CONCURRENCY-SAFE READER-WRITER LOCK WITH TIME OUT SUPPORT

A portion of the disclosure of this patent document is submitted on one compact disc and is hereby incorporated herein by reference. The compact disc contains exactly one file, created on Jul. 2, 2002, which is named "source-txt" and is 75,040 bytes in size. An additional, identical compact disc is also included, for a total of two compact discs.

TECHNICAL FIELD

The invention relates to providing synchronization services for maintaining integrity of data accessed concurrently by both readers and writers.

BACKGROUND OF THE INVENTION

In many information processing applications, multiple executing entities attempt to access data concurrently. For example, in a database program, multiple users may attempt to access the same database tables, records, and fields at the same time. Common examples of such database programs include software for processing class registrations at a university, travel reservations, money transfers at a bank, and sales at a retail business. In these examples, the programs may update databases of class schedules, hotel reservations, account balances, product shipments, payments, or inventory for actions initiated by the individual users. Sometimes a single program executes multiple threads accessing the same data concurrently. For example, one thread may watch for changes in data made by another thread.

However, data corruption may result when concurrent data access is uncontrolled. For example, consider the following scenario in which two computers, A and B, both attempt to remove one item from inventory by subtracting one from an inventory field in a database:

1. The inventory field value is "2"
2. Computer A reads the inventory field ("2") to its local storage
3. Computer B reads the inventory field ("2") to its local storage
4. Computer A subtracts "1" from its local storage, yielding "1"
5. Computer B subtracts "1" from its local storage, yielding "1"
6. Computer A writes its local storage ("1") to the inventory field
7. Computer B writes its local storage ("1") to the inventory field
8. The inventory field value is "1"

One would expect the value "2" to become "0" after two computers attempt to subtract "1" from it, but in the illustrated scenario, the result is instead "1." Since the algorithm failed to take concurrency into account, the database has been corrupted. Such concurrency problems can arise whenever multiple executing entities (e.g., processes, tasks, threads, processors, or programming objects) access the same data.

Programmers have advanced a variety of approaches to address problems arising from concurrent processing. On a general level, many programming systems provide synchronization services to provide certain guarantees even in the face of concurrency. For example, some programming environments support simple synchronization mechanisms such as semaphores, locks, critical sections, and mutual exclusion objects (mutexes); each of these mechanisms controls concurrent access to a resource.

One particular concurrency scenario poses a special set of problems: sharing a resource between readers and writers. Since the readers do not modify the resource, it is commonly acceptable (and generally more efficient) to allow more than one of the readers to access the resource concurrently because there is no chance of data corruption. However, a writer is not permitted to write to (i.e., modify) the resource concurrently while another reader or writer is accessing the resource. Otherwise, the data may become corrupted as shown in the above example.

One approach to solving the reader/writer problem is to employ a synchronization mechanism called a semaphore. A semaphore is a value that multiple processes can check and change simultaneously, and logic associated with the semaphore guarantees the semaphore will not be corrupted. So, for example, the semaphore can be set to on (i.e., 1) or off (i.e., 0) to indicate whether or not a process is accessing the protected resource. Logic associated with the semaphore protects the semaphore from corruption by guaranteeing that two processes cannot simultaneously set the semaphore to on. Thus, a software developer can include logic referencing the semaphore in programming code. For example, a programmer could include logic that waits until a semaphore is off (i.e., 0) before writing to a resource. Thus, a later-in-time process must wait until a first-in-time process is finished with the resource; the later-in-time process then updates the semaphore accordingly to prevent others from writing to the resource.

Specifically, in the reader/writer context, a pair of semaphores can be used for each protected resource to track how many readers access the resource and whether there is a writer accessing the resource. Readers check the "whether there is a writer" semaphore before proceeding, and writers check both the "whether there is a writer" and "how many readers" semaphores before proceeding. However, the semaphore approach has several drawbacks.

First, in a system with many resources to protect, maintaining a pair of semaphores for each of the protected resources may consume excessive system resources. For example, in large database systems, it may require considerable computing power to administer the semaphores for the large number of database fields and tables in the system.

Second, the semaphore approach can lead to a problem called deadlock. Deadlock occurs when two or more processes (or threads) vie for two or more protected resources. For example, consider process A and process B, both of which require writing to fields Y and Z to update a database. Deadlock occurs under the following scenario:

1. Process A updates a semaphore protecting field Y to indicate Y is unavailable to other processes
2. Process B updates a semaphore protecting field Z to indicate Z is unavailable to other processes
3. Process A examines the semaphore protecting field Z and determines Z is unavailable (as noted by B), so process A waits for process B to release field Z
4. Process B examines the semaphore protecting field Y and determines Y is unavailable (as noted by A), so process B waits for process A to release field Y
5. Both processes wait forever Although there are ways of dealing with the deadlock problem, such as conventional deadlock detection and conventional deadlock avoidance, again, considerable computing power is typically required to implement such solutions. Also, none of the solutions completely solves the problem.

In light of the difficulty of solving the deadlock problem and the relative rarity of deadlock conditions, some systems ignore the deadlock problem altogether. However, such an approach can lead to a subtle software defect that is difficult to detect and debug.

Thus, an efficient synchronization mechanism for addressing the reader/writer scenario is needed, and a mechanism for avoiding the deadlock problem is needed.

SUMMARY OF THE INVENTION

The invention includes a method and system for providing reader/writer synchronization services using interlocked operations. Various features provided by the synchronization services lead to better use of resources and improved performance. The synchronization services manage the details of lock operation, freeing programmers from devoting time and resources to develop their own synchronization logic.

Data structures for implementing the reader/writer services can be maintained using an interlocked operation (e.g., an interlocked compare and exchange operation). Such an implementation is sometimes called "lockless" since logic to lock the data structures is not necessary. In addition, by maintaining some data structure elements in storage local to a thread, the lock services can more efficiently access lock state information.

In one arrangement, the system uses an execution suspension mechanism known as an event. The arrangement can thus be implemented on a variety of execution environments that support events.

In a just-in-time event creation feature, the system avoids excessive resource consumption by waiting until there is contention for a lock before creating an event. The event is then released when contention subsides. The system thus reduces the number of simultaneously-active events and reduces the total resources required in an implementation having multiple locks. Additionally, the events can be recycled (i.e., cached) by placing them into an event pool. In this way, the overhead for creating and destroying events is avoided.

A time out feature facilitates an optimistic deadlock avoidance scheme, providing programmers with a feature to address the deadlock problem. Various challenging programming pitfalls relating to implementing time outs are avoided.

For example, races particular to the time out arrangement are addressed to avoid lock corruption or inconsistency. Also, an event creation failure detection feature maintains stability and consistency of lock data structures in the face of insufficient available resources. The synchronization services are thus sufficiently robust for use in the kernel of an operating system or an execution engine.

In addition, the lock services support a set of features for componentized applications. For example, the services support upgrading a lock from reader status to writer status and downgrading a lock from writer status to reader status. Also, the lock can be suspended and restored. In these scenarios, information about intermediate writers (writers accessing the protected resource before the operation is complete) is provided. In addition, lock nesting can be tracked using thread-local storage, and certain nested requests can be monitored and automatically transformed to avoid deadlock.

Finally, a feature to improve efficiency on multiprocessor machines spins a lock request a small number of times before invoking an execution suspension mechanism. Thus, a context switch can be avoided.

Additional features and advantages of the invention will be made apparent from the following detailed description of illustrated embodiments, which proceeds with reference to the accompanying drawings.

BRIEF DESCRIPTION OF THE DRAWINGS

FIG. 4 is a block diagram showing an exemplary lock state data structure arrangement.

FIG. 5 is a block diagram showing an exemplary lock inner state data structure in a single 32-bit word.

FIG. 6 is a flowchart showing a method for adding a reader to a lock state data structure using an atomic compare and exchange.

FIG. 12 is a flowchart showing an alternative exemplary release writer lock method.

DETAILED DESCRIPTION OF THE INVENTION

The invention is directed toward a method and system for providing synchronization services for protecting resources accessed by reading and writing entities. In one embodiment illustrated herein, the invention is incorporated into an operating system entitled "MICROSOFT WINDOWS 2000," both marketed by Microsoft Corporation of Redmond, Wash. Briefly described, this software is a scaleable, high-performance network and computer operating system supporting distributed client/server computing, and providing an object execution environment for object applications conforming to COM.

Exemplary Operating Environment

Figure 1:
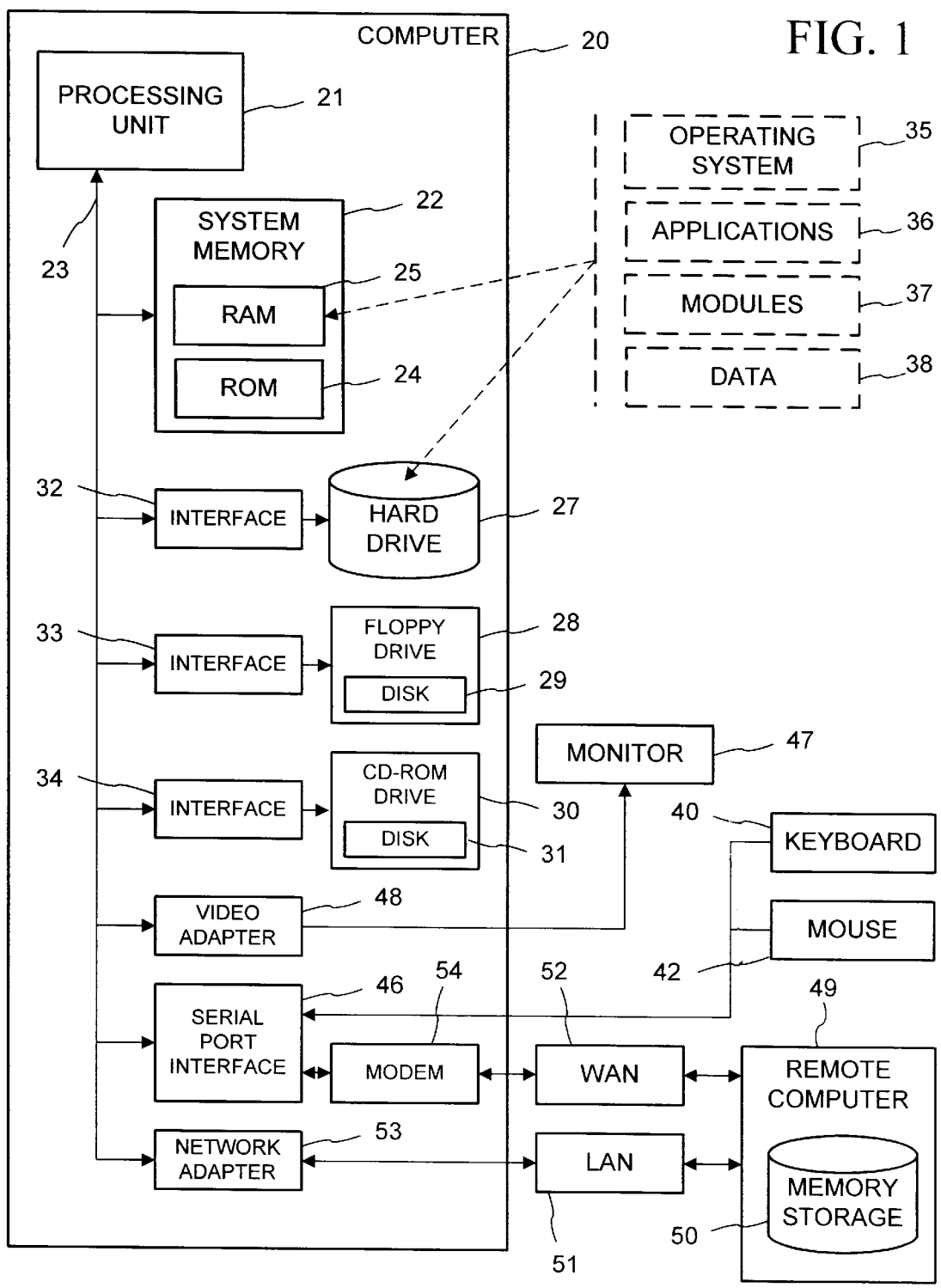
FIG. 1 is a block diagram of a computer system that may be used to implement the described reader/writer lock.

FIG. 1 and the following discussion are intended to provide a brief, general description of a suitable computing environment in which the invention may be implemented. While the invention will be described in the general context of computer-executable instructions of a computer program that runs on a computer, those skilled in the art will recognize the invention also may be implemented in combination with other program modules. Generally, program modules include routines, programs, objects (also called components), data structures, etc. that perform particular tasks or implement particular abstract data types. Moreover, those skilled in the art will appreciate that the invention may be practiced with other computer system configurations, including single- or multiprocessor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Compaq (formerly Digital); MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. The operating system 35 in the illustrated computer is the MICROSOFT WINDOWS NT Server operating system.

A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote client computer 49. The remote computer 49 may be a workstation, a terminal computer, another server computer, a router, a peer device or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Object Overview

Figure 2:
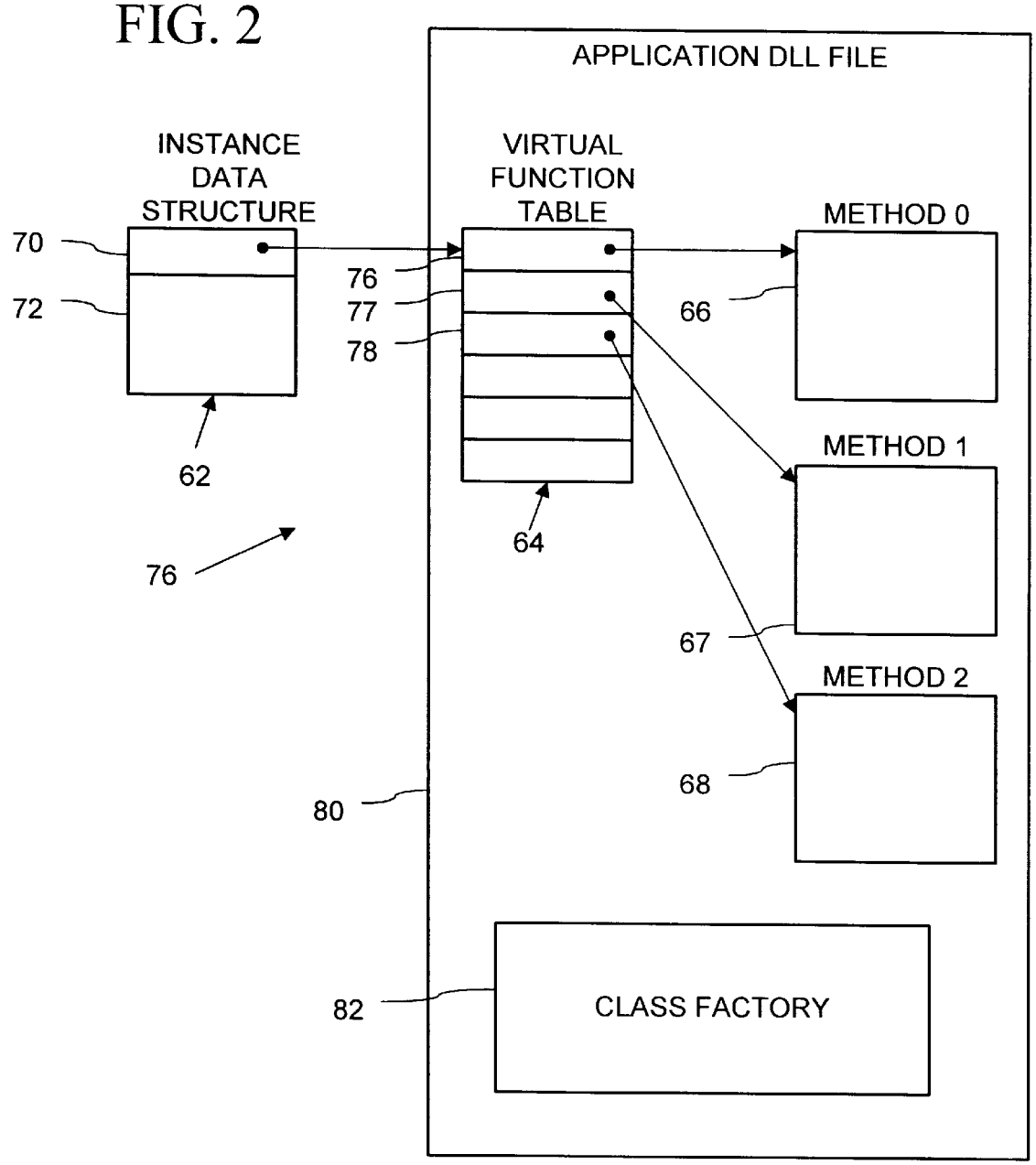
FIG. 2 is a block diagram of an object conforming to the Component Object Model specification of Microsoft Corporation, which may be used to construct objects for developing an object-based application managed by the described application management framework.

FIG. 2 and the following discussion are intended to provide an overview of programming objects, using the MICROSOFT Component Object Model (COM) as an exemplary object model. In the illustrated embodiments, the synchronization services are implemented in an extension to the MICROSOFT COM Environment termed "COM+." COM is a model for accommodating programming objects and can be implemented on a variety of platforms, such as the MICROSOFT WINDOWS NT operating system. In the illustrated embodiments of the invention, the application objects conform to the MICROSOFT Component Object Model ("COM") specification (i.e., are implemented as a "COM Object" 76) and are executed using the COM+ services of the MICROSOFT WINDOWS 2000 operating system, but alternatively may be implemented according to other object standards (including the CORBA (Common Object Request Broker Architecture) specification of the Object Management Group and JavaBeans by Sun Microsystems) and executed under object services of another operating system. The COM specification defines binary standards for objects and their interfaces which facilitate the integration of software programming objects into applications. (For a detailed discussion of COM and OLE, see Kraig Brockschmidt, *Inside OLE, Second Edition*, Microsoft Press, Redmond, Wash. (1995)).

In accordance with COM, the COM object 60 is represented in the computer system 20 (FIG. 1) by an instance data structure 62, a virtual function table 64, and member methods (also called member functions) 66–68. The instance data structure 62 contains a pointer 70 to the virtual function table 64 and data 72 (also referred to as data members, or properties of the object). A pointer is a data value that holds the address of an item. The virtual function table 64 contains entries 76–78 for the member methods 66–68. Each of the entries 76–78 contains a reference to the code 66–68 that implements the corresponding member methods.

The pointer 70, the virtual function table 64, and the member methods 66–68 implement an interface of the COM object 60. By convention, the interfaces of a COM object are illustrated graphically as a plug-in jack as shown for the objects 404 and 428 in FIG. 5. Also, interfaces conventionally are given names beginning with a capital "I." In accordance with COM, the COM object 60 can include multiple interfaces, which are implemented with one or more virtual function tables. The member function of an interface is denoted as "IInterfaceName::MethodName."

The virtual function table 64 and member methods 66–68 of the COM object 60 are provided by an object server program 80 (hereafter "object server DLL") which is stored in the computer 20 (FIG. 1) as a dynamic link library file (denoted with a ".dll" file name extension). In accordance with COM, the object server DLL 80 includes code for the virtual function table 64 and member methods 66–68 of the classes that it supports, and also includes a class factory 82 that generates the instance data structure 62 for an object of the class.

Other objects and programs (referred to as a "client" of the COM object 60) access the functionality of the COM object by invoking the member methods through the COM object's interfaces. First however, the COM object is instantiated (i.e., by causing the class factory to create the instance data structure 62 of the object); and the client obtains an interface pointer to the COM object.

Before the COM object 60 can be instantiated, the object is first installed on the computer 20. Typically, installation involves installing a group of related objects called a package. The COM object 60 is installed by storing the object server DLL file(s) 80 that provides the object in data storage accessible by the computer 20 (typically the hard drive 27, shown in FIG. 1), and registering COM attributes (e.g., class identifier, path and name of the object server DLL file 80, etc.) of the COM object in the system registry. The system registry is a configuration database.

A client requests instantiation of the COM object using system-provided services and a set of standard, system-defined component interfaces based on class and interface identifiers assigned to the COM Object's class and interfaces. More specifically, the services are available to client programs as application programming interface (API) functions provided in the COM+ library, which is a component of the MICROSOFT WINDOWS 2000 operating system in a file named "OLE32. DLL." Also in COM+, classes of COM objects are uniquely associated with class identifiers ("CLSIDs"), and registered by their CLSID in a system configuration database referred to as the "registry." The registry entry for a COM object class associates the CLSID of the class with information identifying an executable file that provides the class (e.g., a DLL file having a class factory to produce an instance of the class). Class identifiers are 128-bit globally unique identifiers ("GUIDs") that the programmer creates with a COM+ service named "CoCreateGUID" (or any of several other APIs and utilities that are used to create universally unique identifiers) and assigns to the respective classes. The interfaces of a component additionally are associated with interface identifiers ("IIDs").

In particular, the COM+ library provides an API function, "CoCreateInstance( )," that the client program can call to request creation of a component using its assigned CLSID and an IID of a desired interface. In response, the "CoCreateInstance( )" API looks up the registry entry of the requested CLSID in the registry to identify the executable file for the class. The "CoCreateInstance( )" API function then loads the class executable file, and uses the class factory in the executable file to create an instance of the COM object 60. Finally, the "CoCreateInstance( )" API function returns a pointer of the requested interface to the client program. The "CoCreateInstance( )" API function can load the executable file either in the client program's process, or into a server process which can be either local or remote (i.e., on the same computer or a remote computer in a distributed computer network) depending on the attributes registered for the COM object 60 in the system registry.

Once the client of the COM object 60 has obtained this first interface pointer of the COM object, the client can obtain pointers of other desired interfaces of the component using the interface identifier associated with the desired interface. COM+ defines several standard interfaces generally supported by COM objects including the "IUnknown" interface. This interface includes a member function named "QueryInterface( )." The "QueryInterface( )" function can be called with an interface identifier as an argument, and returns a pointer to the interface associated with that interface identifier. The "IUnknown" interface of each COM object also includes member functions, "AddRef( )" and "Release( )", for maintaining a count of client programs holding a reference (e.g., an interface pointer) to the COM object. By convention, the "IUnknown" interface's member functions are included as part of each interface on a COM object. Thus, any interface pointer that the client obtains to an interface of the COM object 60 can be used to call the QueryInterface function.

Illustrated Embodiments

In the following illustrated embodiments, synchronization services are provided to executing entities performing read and write operations on a protected resource. In the illustrated embodiments, the reading and writing entities are threads running in various processes; however, the illustrated principles could equally be applied to other executing entities, including processes, tasks, computer systems, processors, and programming objects.

In the illustrated embodiments, each process can have one or more threads. The practice of executing more than one thread per process is called multithreading. The illustrated embodiments thus provide useful synchronization services for use in a multithreading context, allowing programmers to more easily develop thread-safe solutions to various programming problems.

Overview of Reader/Writer Synchronization Services

Figure 3:
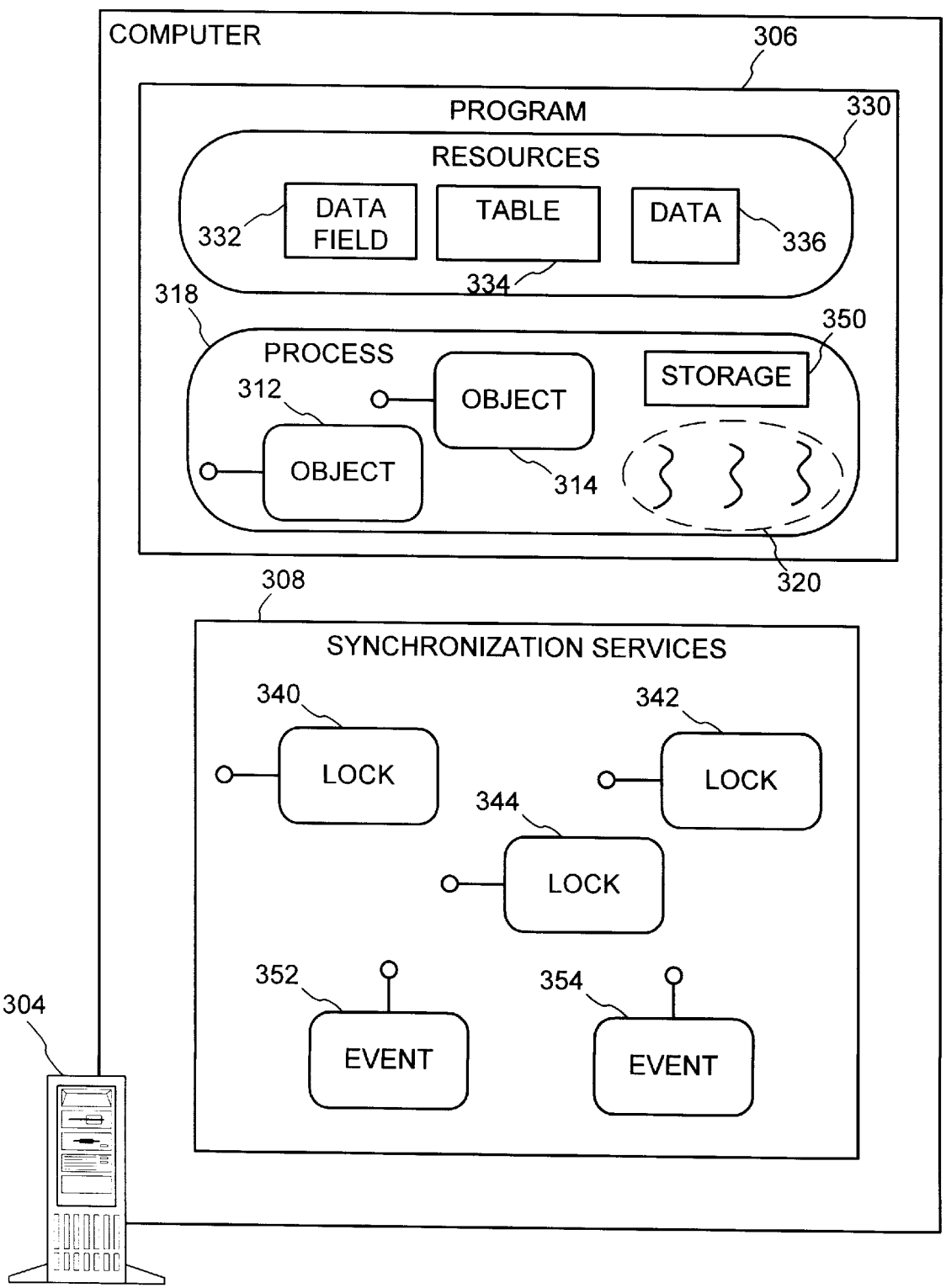
FIG. 3 is a block diagram showing an exemplary lock services architecture.

An overview of an exemplary arrangement utilizing an event-based reader/writer synchronization service system is shown in FIG. 3. In the example, a computer 304 executes a program 306. The program 306 is a client of the synchronization services 308 and comprises various objects 312 and 314 residing in a process 318, which accomplishes work for the program 306. The threads 320 of the process 318 execute the logic associated with the objects 312 and 314, and more than one thread can be executing an object's logic concurrently. Although a single process 318 in a single program 306 is shown, there may be multiple processes and programs accessing various protected resources 330, such as a data field 332, a database table 334, or other data 336. The resources 330 are protected in that concurrent access to them is controlled to prevent corruption.

From time to time, the objects 312 or 314 require reading from and writing to (i.e., modifying) the protected resources 330. To prevent data corruption, the objects contain logic to acquire a lock before reading or writing to the protected resources 330. When acquiring the lock, the object specifies whether it will be a reader (i.e., perform only reads on the protected resource while holding the lock) or a writer (i.e., perform at least one operation modifying the resource while holding the lock). Since the threads 320 execute the logic in the objects 312 or 314, the arrangement is sometimes described in terms of reading or writing threads (or simply "readers" and "writers"). However, the synchronization services could also be used in an arrangement wherein each process has only one thread, so it may be appropriate to describe the arrangement in terms of reading or writing processes. The terms "readers" and "writers" could similarly be applied, then, to any executing entity.

In the illustrated example, an execution environment (e.g., an operating system or a virtual machine) includes a synchronization services module 308 providing lock objects 340, 342, and 344. In the example, the lock objects 340, 342, and 344 provide an interface having various methods, such as AcquireReaderLocko( ) and ReleaseWriterLock( ) which are accessed by the objects 312 and 314. In keeping with the principles of object-oriented programming, the lock objects 340, 342, and 344 can include various data members for tracking the state of the lock. In one implementation, a portion of the lock state is stored in thread local storage 350.

From time to time, execution of various of the threads 320 is suspended via the synchronization services 308 using events 352 and 354. This technique is sometimes called "blocking." Typically, a thread's execution remains suspended until the event 352 or 354 is sent a resume indication, although a time out feature is supported, as described in more detail below.

Use of the synchronization services may vary widely in practice. For example, instead of protecting data fields, the locks may be used to protect any resource, such as a programming object or hardware.

Lock Terminology

The reader/writer synchronization services provide protection for a resource when properly called by executing entities. For example, a thread about to perform a read calls a "Request Reader Lock" function before performing the read. Sometimes such a sequence is called "requesting protection for a read operation," "attempting to acquire a reader lock," or "requesting a reader lock." Similarly, a thread about to perform a write is "requesting protection for a write operation," "attempting to acquire a writer lock," or "requesting a writer lock."

Typically, the acquire function returns a result code indicating success or failure (e.g., due to a time out). The sequence of requesting the lock and meeting with success is sometimes called simply "acquiring a reader (or writer) lock." Providing the protection to the requesting thread (e.g., as evidenced by providing an indication of success) is sometimes called simply "granting the lock."

Subsequently, the executing entity releases the lock. During the time between when the executing entity has acquired the lock and when it releases the lock, the executing entity is said to hold the lock. When a lock is released by one executing entity that releases the lock for grant to another executing entity, the releasing executing entity is sometimes said to "pass" the lock.

Overview of Lockless Operation

Various data structures can be used to represent a lock's state. When a thread attempts to acquire a lock, the lock's state is checked and updated if appropriate. Efficiency of the lock can be increased by using an interlocked operation (e.g., interlocked compare and exchange, interlock exchange and add, interlocked increment, or interlocked test and set). For example, an interlocked compare and exchange operation can simultaneously check the lock's state and update it.

Typically, the interlocked operation provides an indication of whether the update was successful. Failure typically indicates the lock could not be granted because the lock state could not be changed. The logic of the synchronization services may then take other steps (e.g., suspend execution of the requesting thread until the lock is available). The various interlocked operations can be incorporated in the logic of the synchronization services to avoid a separate lock protecting the lock's state.

Although some implementations of interlocked compare and exchange operate with a low level (e.g., hardware) lock, a synchronization mechanism (e.g., a lock) constructed with them is sometimes called "lockless" because the low level lock requires no additional data structures and is very efficient. The advantage to such an arrangement is that additional resources required for maintaining data structures for a separate lock are avoided.

In the particular case of a reader/writer lock constructed using interlocked operations, data structures for the reader/writer lock are maintained, but separate data structures for locks to maintain the data structures for the reader/writer lock are not required. In other words, the reader/writer lock is a lock, but the data structures for the lock are maintained without need for a separate lock data structure.

Constructing a reader/writer lock supporting time outs with interlocked operations poses certain programming challenges. Solutions to these challenges ensure the lock is stable and consistent and thus suitable for use in an operating system or execution engine.

Overview of Componentized Application Support Features

As is described in more detail in a later section, it is common for programs to be constructed from multiple components. A single executing entity such as a thread may execute instructions in more than one component to complete work. One of the goals of object-oriented programming is to enable components from various sources to work together. Ideally, a component developer can implement logic accessing synchronization services without knowledge of the logic within clients of the component. The reader/writer lock services, however, present a challenging problem for componentized software (i.e., software composed of programming components).

Particularly, a thread may be executing a first component containing logic that acquires a writer lock. The first component might then call a second component containing logic for acquiring the same writer lock. The second component would then wait for the first component to release the lock (the lock cannot be granted to two writers), a condition that will never occur because the thread executes logic in the components sequentially. Thus, a deadlock occurs.

To prevent such a deadlock, the synchronization services provide lock nesting. Calls to the same lock by the same thread are nested by tracking a writer nest level. For example, two requests by the same thread for the same lock as a writer would result in a next level of two. Subsequently, when the thread calls a release lock function, the nest count is decremented. The lock is not actually released for use by other threads until the nest count reaches zero.

For nested readers, storage local to the executing entity (e.g., thread local storage in the case of a thread) can be used to store the nest level (e.g., an integer indicating the level of nesting). Such an arrangement can improve efficiency because only local storage need be checked to determine if the lock is available. In other words, if the thread already has been granted the lock as a reader when executing logic in a component, the lock is available for read operations by the same thread while executing another component.

Another feature called auto-transformation facilitates componentized software. For example, consider a thread executing a first component having logic acquiring a writer lock. The first component then calls a second component having logic for acquiring the same lock as a reader. At this point the thread waits for the first component to release the lock, a condition that will never occur (similar to the nesting deadlock described above).

However, it is not necessary that the second component wait because the purpose of the lock is to prevent concurrent access by a reader and a writer. In the aforementioned example, a single thread performs write and read operations serially (not concurrently). Since the thread already has the writer lock, no other thread should be performing read or write operations. Responsive to such a request, the synchronization services can transform the reader lock request into a writer lock request. Typically, the request is then nested as described above.

Yet another feature supports upgrading the lock from reader to writer. Such a function is useful in a common scenario in which logic reads a resource, checks a condition, then writes to the resource depending on the condition outcome. Depending on circumstances, it may be common for the lock to be upgraded before any other writers modify the resource. In such cases, resources expended on releasing and reacquiring the lock are saved.

Accordingly, the upgrade feature provides an indication of whether the lock was granted to a writer (other than the executing entity) before the lock could be upgraded. Such a writer is sometimes called an "intervening" or "intermediate" writer. A downgrade feature works in a similar fashion.

Still another feature supports suspending and restoring the lock. Such a feature is particularly useful when calling code that may crash (sometimes called "untrusted" code) or code requiring input by a user (which typically spans vast numbers of machine clock cycles). If the called code does crash, the lock is not left granted to code that will never release it. If the called code spans vast numbers of machine clock cycles, the lock can be granted to others in the meantime.

However under some circumstances it may be common that the called code does not crash and returns before the resource has been modified. In such cases, resources expended on releasing and reacquiring the lock are saved. Again, the feature provides information indicating whether there were any intervening writers.

The nesting, auto-transformation, upgrade, downgrade, and suspend features could also be used in scenarios other than multiple component scenarios (e.g., within a single component or in multiple or recursive subroutines).

Execution Suspension

Under certain circumstances, in response to a lock request, the synchronization services utilize an execution suspension mechanism on which a thread waits; a resume indication can be sent to the mechanism to resume execution of the waiting thread. When the lock is granted, the synchronization services send the resume indication to the mechanism; the thread then resumes execution, having been granted the lock.

Overview of Time Outs

The synchronization services also support a time out for lock requests. If after a time out period expires, the request still can not be granted due to activity by other threads, the request times out, and the thread resumes execution. An indication is provided to the caller (running on a thread) that the lock was not granted (e.g., a code indicating failure). In other words, when an executing entity requests a lock, execution will resume after some waiting period, even if the lock request cannot be granted. As will be described at length, such an arrangement is useful for constructing a deadlock avoidance scheme.

One way of providing time outs is by using an execution suspension mechanism that supports time outs. After expiration of a specified time out, the execution suspension mechanism resumes execution of the suspended thread, even if no resume indication is provided to the mechanism.

Overview of Event Object Management

Various illustrated embodiments particularly describe one execution suspension mechanism: an event object (sometimes simply called an "event"). An executing entity such as a thread can wait on the event. At some later time, execution of the thread can be resumed by sending a resume indication to the event (sometimes called "setting" the event). If a time out is provided, the thread resumes execution even if no resume indication is received. The synchronization services manage the event objects to increase efficiency and avoid corrupting a lock's state.

An event could be automatically created for each lock (e.g., an event object could be created when a lock object is created). However, an implementation can avoid undue consumption of resources by waiting until there is contention on the lock (e.g., a reader requests the lock while it is granted to a writer) before creating an event. Typically, then, the resources (i.e., those for creating events) required are bounded by the number of simultaneously-executing threads rather than the number of locks. For instance, an implementation so constructed with eighty locks and seven threads would typically require enough resources for creation of seven events, not eighty.

Additionally, events can be created when there is contention and destroyed after contention subsides. However, an implementation can avoid undue consumption of resources (e.g., computation cycles from creating and destroying events) by maintaining an event pool. Instead of destroying the events, they can be returned to the event pool for subsequent use by another lock or another executing entity.

Overview of Hybrid Spin Lock

Another feature supported by the lock services is useful in multi-processor machines. When a lock is requested but not available, the logic can spin on the lock a small number of times before suspending execution of the requesting entity. This feature is called a hybrid spin lock because the lock behaves in some ways as a spin lock.

The advantage to such an arrangement is that the lock may in fact be released by another processor during the spin. The arrangement thus avoids consuming resources for a context switch that might occur if the lock immediately suspended execution of the requesting entity.

Overview of Efficient Combination of Features into a Single Set of Services

In one implementation, the above-described features are combined into an integrated synchronization service. Maintaining the lock state while supporting the features as invoked by concurrently-executing entities presents challenging programming problems, especially in light of the interlocked operation features and support for time outs. However, the locks provided by such synchronization service are highly efficient and very useful for a variety of programming tasks.

Detailed Description of Reader/Writer Synchronization Services

The following sections further describe various aspects of the reader/writer synchronization services in greater detail using various exemplary arrangements. In the following examples, the executing entities are described as threads; however, an arrangement facilitating other executing entities could be constructed in a similar fashion. Similarly, various levels of indirection (e.g., via pointers) can be added or diminished in the implementations. The synchronization services administer a lock for each protected resource having concurrent readers and writers. For purposes of the synchronization services, a group of resources may be considered a single (i.e., "logical") resource.

Time Outs

As described in more detail below, the reader/writer synchronization services can be crafted to support -time outs. The synchronization services can provide a timeout value as a matter of default, or a parameter can be provided with the lock request specifying a particular time out value (e.g., milliseconds). To acquire the lock with no time out a special value (e.g., −1) can be submitted as the time out value. Typically, when the thread times out, an indication is provided upon resuming execution of the thread that the thread failed to acquire the lock. Logic in the thread can thus take appropriate steps.

Lock Data Structures

A variety of data structure arrangements can be used to provide reader/writer synchronization services. The following describes an implementation in which a lock's state is maintained in various fields. Some of these fields can be grouped in a particular way to facilitate interlocked operations on the fields. Certain data structures can be stored separately, in memory more local to the executing entity requesting a lock.

An exemplary lock data structure 402 is shown in FIG. 4. In the example, various portions of the lock data structure 402 are stored by the lock object 404.

Table 1 shows the fields of the lock object.

TABLE 1

Lock Fields stored by a Lock Object

| Name | Function |
|---|---|
| Readers 406 | Indicates the number of readers holding the lock |
| Reader Signaled 408 | Indicates when the lock is being passed to a waiting reader; can serve as a communication mechanism between a thread passing the lock and a thread that has resumed execution due to a timed out event; the resuming thread can acquire the lock to avoid a corrupt lock state. This field can be used to avoid race conditions. It can also be used to indicate when event caching operations are being performed. |
| Writer 410 | Indicates whether a writer holds the lock |
| Writer Signaled 412 | Indicates when the lock is being passed to a waiting writer; can serve as a communication mechanism between a thread passing the lock and a thread that has resumed execution due to a timed out event; the resuming thread can acquire the lock to avoid a corrupt lock state. This field can be used to avoid race conditions. It can also be used to indicate when event caching operations are being performed. |
| Waiting Readers 414 | Indicates the number of readers waiting on the lock |
| Waiting Writers 416 | Indicates the number of writers waiting (requested but not yet acquired) on the lock |
| Writer ID 420 | Stores the thread ID of the thread currently holding the lock |
| Writer Sequence 422 | Incremented each time the lock is granted to a writer |
| Writer Nesting Level 424 | Number of times the writer lock has been granted to the thread holding the lock as a writer |
| Writer Event 426 | Points to an event on which waiting writers can wait for the lock |
| Reader Event 427 | Points to an event on which waiting readers can wait for the lock |

In addition, an event object 428 provides a suspension execution mechanism on which a thread can wait. Also, various portions of the lock data structure are stored in locations 430 local to the threads calling the synchronization services. Particularly, a reader nest level 432A, stored in a location local to a particular thread indicates the reader nesting level for the thread. Other reader levels (e.g., reader level 432N) can be stored at other locations local to other threads and indicate the reader nesting levels for those threads. The reader nesting level indicates the number of times the reader lock has been granted to a thread. Finally, cookies 440 are used to track writer sequence number and nesting level for upgrade, downgrade, and suspend features.

Further detail of the lock object data is shown in FIG. 5. In the example, various fields are stored in a single unit 450 of memory, such as a 32-bit word (e.g., in a lock object data member called "dwstate"). Such an arrangement facilitates use of interlocked operations (e.g., interlocked test and set) and ensures updates to the fields can be performed atomically. This set of fields 450 is sometimes referred to as the "inner lock state."

Table 2 shows an exemplary inner lock state arrangement:

TABLE 2

Inner Lock State Fields

| Name | Size |
|---|---|
| Waiting Writers 452A | 9 bits (most significant) |
| Waiting Readers 452B | 10 bits |
| Writer 452C | 1 bits |
| Writer Signaled 452D | 1 bits |

TABLE 2-continued

Inner Lock State Fields

| Name | Size |
| --- | --- |
| Reader Signaled 452E | 1 bits |
| Readers 452F | 10 bits (least significant) |

Bitwise operations, mask values, and shifts can be used to access the various fields. Since the readers field 452F is placed at the least significant portion of the data structure 450, a function checking if only readers or no readers hold the lock can use a compare statement using the readers mask value (e.g., comparing with a hexidecimal value 000003F). This comparison also ensures the field will not overflow when one is added to the value. Essentially, the condition "are there only readers or no readers, and is there room for another reader?" can be tested with a condition "lock state<readers mask?"

Lockless Operation

Logic in the synchronization services takes advantage of certain interlocked operations to improve efficiency. In some implementations (e.g., for an Intel Pentium or Compaq Alpha processors), certain interlocked operations (e.g., compare and exchange) are translated into native test and set instructions (e.g., machine-level opcodes), avoiding more cumbersome locks such as critical sections.

An exemplary interlock operation, InterlockedCompareExchange is defined by the following instruction:

PVOID InterlockedCompareExchange {
  PVOID *Destination, // pointer to the destination pointer
  PVOID Exchange, // the exchange value
  PVOID Comparand // the value to compare
};

The exchange value can be described as a proposed exchange value, which is stored at a location specified by the destination pointer if the value to compare equals the current destination value. The instruction returns the value the destination had before the instruction was executed. In other words, if the instruction returns the comparand value, the exchange was successful. Otherwise, an exchange did not take place. The operations performed by the instruction are guaranteed (e.g., by the processor) to be atomic.

The interlocked compare and exchange functionality can be used in the following way: acquire a current state of the lock in a temporary variable, modify the temporary variable to a desired value, then execute the interlocked compare and exchange functionality to swap the temporary variable into the lock (only if the lock's state has not changed). In this way, the logic avoids taking action based on a condition having been made false (by another concurrently-executing thread) before the logic completes its action. The interlocked operation can thus both check the lock state to determine if the lock is available and grant the lock by modifying the lock state together with a single instruction.

For example, the flowchart at FIG. 6 shows an exemplary method for handling a request to acquire a lock as a reader using an atomic compare and exchange. At 502, the method loads portions of the current lock state (e.g., inner state 450 of FIG. 5) into a variable. At 504, the method stores the value of the variable as an old value (for later comparison). At 506, the method checks to see if the variable indicates the lock is available for a reader. For example, as described above, a comparison of the variable against the readers mask would indicate if the lock is available for a reader. If the lock is not available, other actions 508 can be taken (e.g., wait for the lock to become available). Otherwise, at 510, one is added to the variable to increase the reader count (e.g., readers 452F) as represented in the variable. At 512, the method then attempts to exchange the variable with the now current lock state, based on whether the current lock state is still the same as the old value. The operation at 512 is performed using an interlocked compare and exchange instruction (e.g., an instruction comprising a test and set instruction native to the processor). At 514, it is determined if the instruction was successful by comparing the result of the compare and exchange with the old value (if they are equal, the compare and exchange was successful). If the instruction was successful, the lock was acquired at 516. Otherwise, the lock was not acquired at 520. An example of when the instruction would not be successful would be if a concurrently-executing thread acquired the lock as a writer during the execution of 504, 506, or 510.

The illustrated method is guaranteed to be thread-safe because a change is made to the lock state only when the assumption underlying the change (i.e., that the lock is available for a reader) remains true at the time the lock state is being charged. A method for acquiring a writer lock would work somewhat similarly; however, as more features are added to the lock, the logic becomes more abstruse. It is particularly challenging to construct synchronization service using the various interlocked operations in conjunction with supporting time outs.

Race Conditions

Developing software for concurrently executing entities (or "thread-safe" software) introduces a vexing set of problems called race conditions. An exemplary race condition arises when a first executing entity takes an action based on an assumption having since been made false by an intervening second concurrently-executing entity. For example, a first thread might check to see if there are any writing threads waiting to acquire a lock and determine that there is one waiting writer. The first thread then attempts to send a resume indication to the event on which the waiting writer is waiting. In the meantime (after the first thread determined there was a waiting thread, but before the first thread sent the resume indication), the waiting writer has timed out. Thus, the first thread has sent a resume indication to an event on which no thread is waiting (the writer has resumed execution after timing out and is no longer waiting on the event). Thus, the lock has effectively been passed to a thread no longer waiting on it. Such scenarios may leave the system in an unstable or inconsistent state, rendering the lock unusable.

Since programrmmers typically write software using sequential code listings, race conditions are difficult to detect. Further, a race condition may go unnoticed because its manifestation in practice is typically very rare. And, even if the race is discovered, it may be very difficult to reproduce. Detecting and eliminating race conditions is a challenging part of developing trusted code such as that in an operating system kernel or an execution engine. Various race conditions avoided by the synchronization services are explained in more detail below.

Support for Componentized Software

Figure 7:
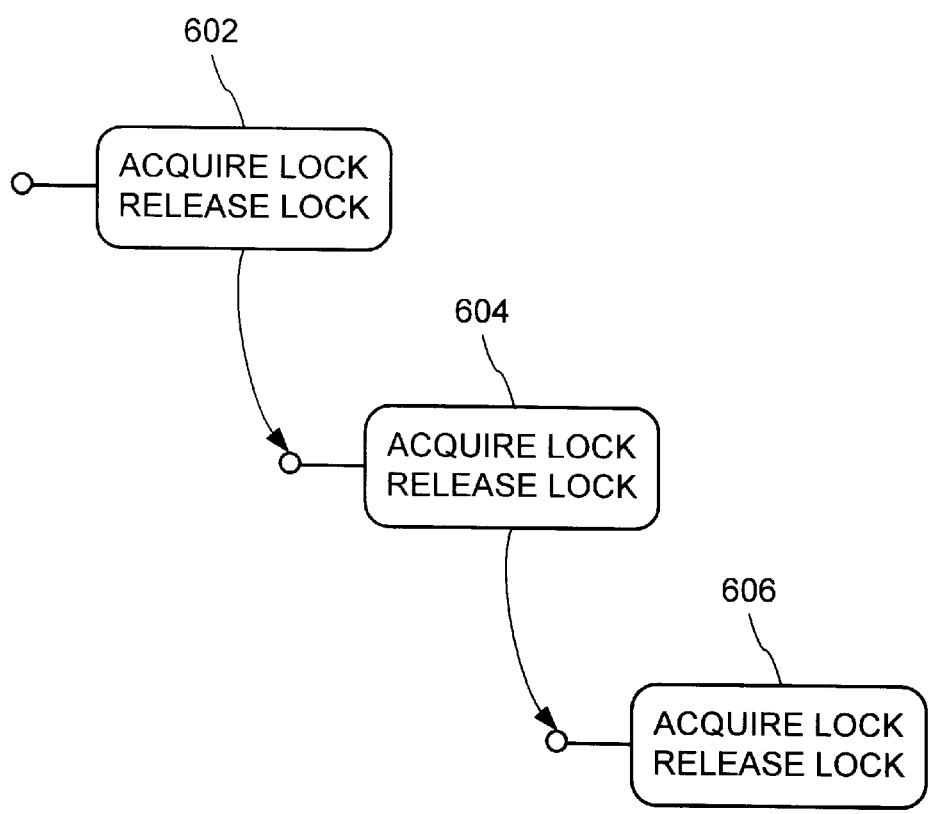
FIG. 7 is a block diagram showing plural downstream components accessing synchronization services.

FIG. 7 shows a possible arrangement involving componentized software. A client program (e.g., component 602) accesses the functionality of another component 604 by invoking methods on the component 604. In accordance with the principles of object-oriented programming, the component 604 can preferably be developed without knowledge of the internal operation of its client 602. For example, separate teams or organizations might develop the client 602 and component 604. Thus, components 604 and 606 later in the calling chain (or "downstream") from the client 602 preferably can access synchronization services without regard for the operations of their upstream clients.

Although the components 602, 604, and 606 might be executed simultaneously by multiple threads, each thread executes serially. Special functionality is provided in the synchronization services to support the concurrent execution of componentized software.

Lock Nesting

Lock nesting can track a writer nest level and a reader nest level to take into account the peculiarities that arise when one component accessing the synchronization services calls another component accessing the synchronization services.

For example, with reference to FIG. 7, if the component 602 acquired a lock as a writer and then called component 604, which attempted to acquire the same lock as a writer, the logic might simply determine the lock is unavailable because it has already been granted. However, if the logic tracks the thread ID in the lock data structure (e.g., in writer ID 420 in FIG. 4), it can be recognized that the same thread is now requesting the lock. It is permissible to grant the same writer lock twice (or more) to the same thread because a single thread does not pose problems associated with concurrently-executing threads.

The writer nesting level of the lock is tracked (e.g., in writer nesting level 424 in FIG. 4). The nesting level is incremented upon acquisitions by the same thread and decremented upon releases by the same thread. When the writer nesting level reaches zero, the lock is actually released for use by other threads.

Similarly, a reader nesting level is tracked. However, the value can be tracked in storage local to the thread (e.g., in reader nesting level 432A in FIG. 4). In this way, the logic provides superior performance because accessing storage local to the thread improves performance compared to accessing other storage. The logic for the reader nesting level is somewhat different because the lock is not necessarily released when the nesting level reaches zero (another thread may still hold the lock as a reader).

Auto-Transformation

Auto-transformation of a lock request facilitates the instance when a component 602 acquires the lock as a writer, and then calls another component 604, which attempts to acquire the lock as a reader. The logic might simply determine the lock is unavailable because it is already granted to a writer. However, by tracking the thread ID in the lock data structure (e.g., in writer ID 420 in FIG. 4), it can be recognized that the same thread is now requesting the lock. It is permissible to grant the reader lock to a thread that already holds the lock as a writer because a single thread does not pose problems associated with concurrently-executing threads.

Thus, the logic transforms the reader lock request into a writer lock request, and the request is granted. Accordingly, the request is nested as described above. Subsequently, when the component releases what it effectively assumes is a reader lock, the release is transformed into a release writer lock. The nesting level is then decremented as described in the discussion of nesting above.

Altering Requests

After a request for the lock has been granted, the request can be altered (e.g., upgraded, downgraded, or suspended). In such a case, information about intervening writers can be provided so that appropriate action can be taken by the logic requesting the lock alteration.

Upgrade/Downgrade

As described above, a lock upgrade feature can lead to more efficient operation under certain circumstances. Accordingly, the synchronization services provide such a function. When calling the lock upgrade feature, a pointer to a cookie is passed by which the upgrade method tracks variables to determine if there were any intervening writers and restore nesting levels.

Another aspect of the upgrade method is that the method checks to see if the thread already holds the lock as a writer or holds no lock. Thus, the upgrade method can be called to acquire a writer lock regardless of whether the thread holds the lock as a reader.

The upgrade method provides an indication of whether there were any intervening writers by observing the writer sequence (e.g., writer sequence 422 of FIG. 4). If the writer sequence has changed, then another thread intervened by acquiring the lock as a writer before the lock could be reacquired by the thread requesting the upgrade. Under certain circumstances, intervening writers might be somewhat unlikely, so the upgrade feature would be more efficient than releasing and reacquiring the lock.

A downgrade feature operates in a similar manner, and also uses a cookie to track the writer sequence number and restore nesting levels.

Suspend/Restore

As described above, a suspend lock feature is desirable under certain circumstances. To provide such a feature, a method can be provided on a lock object with reference to a cookie in which various parts of the lock data structure (e.g., writer sequence 422 of FIG. 4) are stored.

Subsequently, when the lock is restored, a restore method provided with the same cookie can restore the lock data structure and provide an indication of whether there were any intervening writers.

Event Objects

In the illustrated embodiments, the described execution suspension mechanisms are event objects, which are provided by the MICROSOFT WINDOWS NT operating system. However, various substitutes could be used. For purposes of brevity, event objects are sometimes simply called "events."

Events can function as a mechanism for synchronization between two threads because one of the threads can send a resume indication to the another thread (sometimes called "setting the event") waiting on the event. For example, a first thread can wait on an event until a second thread indicates it has finished a particular task; the second thread indicates it has finished by sending a resume indication to first thread. Thus, it can be guaranteed that the first thread will not execute until the second thread has accomplished a particular task (e.g., released the lock).

In addition, the described events support a time out mechanism. The time out allows execution to return to the thread (e.g., after a certain number of milliseconds) even if the event is not sent a resume indication. Accordingly, when the thread resumes execution after waiting on an event, the event provides an indication allowing the thread to determine whether it resumed due to a resume indication (i.e., "successfully waited") or timed out. The thread can take appropriate action depending on the outcome.

The illustrated events support a variety of operations, including creating, waiting, resuming, and releasing. In the context of a reader/writer lock, events can be used to resolve contention on the lock. In sum, a requesting thread can be forced to wait on an event if the lock is already held by another thread if granting the lock to the requesting thread would conflict with reader/writer rules (e.g., if a writing thread requests a lock already held by a reader). The event is sent a resume indication at the appropriate time (e.g., a last reader releasing the lock calls an appropriate method of the event).

Automatic and Manual Events

The illustrated event objects support two basic event types: automatic and manual. A basic difference between the two types lies in the way each handles multiple waiting threads. When sent a resume indication, an automatic event resumes one of the threads waiting on it and then resets the event (i.e., makes the other threads wait). Accordingly, automatic events facilitate allowing threads to resume execution one at a time. When a manual event is sent a resume indication, the event resumes all of the threads waiting on the event, and the event must be reset manually by a thread. Accordingly, manual events facilitate allowing multiple threads to resume execution until the event is manually reset.

A useful analogy is to describe the event as a gate. Sending a resume indication (or "setting") the event opens the gate. Resetting the event closes the gate. For automatic events, only one thread is allowed to pass through the open gate. For manual events, the gate is simply left open for threads to pass through until the event is reset.

In the reader/writer context, automatic events are appropriate for controlling lock logic related to writers because only one writer should be allowed to acquire the lock at a time. Manual events are appropriate for controlling lock logic related to readers because multiple readers may acquire the lock when there are no writers holding the lock.

Event Management

Various aspects of event management are handled to increase efficiency of the lock and maintain a consistent state of the lock. The features include just in time event creation, caching events, and avoiding race conditions.

Just in time event creation refers to the practice of deferring creation of events until contention on the lock is detected. For example, when a lock is first initialized, no events are created (e.g., the locations 426 and 427 in FIG. 4 are null pointers). Later, when a reader requests the lock while a writer holds it, an appropriate event is created (e.g., a manual event is created and a pointer to it is stored in reader event 427 in FIG. 4). Later, when the last waiting reader is signaled, the event can be destroyed.

Caching the events places the events in an event pool (e.g., a linked list of events). To address possible problems created by concurrent execution, an interlocked operation (e.g., compare and exchange) is used to add recycled events to the head of an event list.

An exemplary race condition encountered when managing events occurs when two writers (or two readers) race to create an event and store it in the lock state (e.g., writer event 426 in FIG. 4). Due to concurrency, the following sequence could occur when two threads, $W_1$ and $W_2$, attempt to acquire a writer lock.

1. The lock is held by a reader.
2. Seeing the lock is held by a reader, $W_1$ prepares to wait on an event. $W_1$ checks the writer event field and determines the writer event field is empty.
3. Seeing the lock is held by a reader, $W_2$ prepares to wait on an event. $W_2$ checks the writer event field and determines the writer event field is empty.
4. Having seen no already-existing event, $W_1$ creates an event $E_1$ on which it will wait.
5. Having seen no already-existing event, $W_2$ creates an event $E_2$ on which it will wait.
6. $W_1$ stores a reference to $E_1$ in the writer event field and waits on $E_1$.
7. $W_2$ stores a reference to $E_2$ in the writer event field (overwriting the reference to $E_1$) and waits on $E_2$.
8. A thread releasing the lock sets the event in the writer event field ($E_2$), and $W_2$ resumes execution.
9. $W_1$ waits forever (or times out) because the reference to $E_1$ has been lost.

To avoid this scenario, before writing an event into the writer event field, the synchronization services check to ensure there is not already an event in the field (and thus avoid the overwriting error of 7, above). The logic incorporates an interlocked operation to ensure checking and changing the writer event field is done atomically. Similar logic is applied when writing an event into a reader event field (e.g., reader event 427 in FIG. 4).

Also, under certain conditions, such as when insufficient memory is available, an event creation operation may fail. According to conventional programming practices, when such a failure is detected, the method in which the failure is detected immediately returns with a failure result. In an event-based lock implementation with concurrently-executing requesting readers and writers, however, immediately returning a failure result may render the lock unusable if a particular set of circumstances arises.

For example, logic for concurrency-safe synchronization services might include logic forcing readers attempting to acquire the lock having contention to create an event and wait for the event to be sent a resume indication (e.g., by a releasing writer). The writer lock release code might see there are readers waiting (i.e., needing to be resumed); however, when the writer calls to get the event on which they are waiting, it turns out the concurrently-executing readers have not yet created the event. The get event function automatically tries to create a new event on which new readers may wait. If the get event function fails, and the readers still have not created an event, there is no way for the writer to resume the waiting readers.

If the writer were to simply abort, subsequently, when the readers finally did create an event on which to wait, the writer would never resume them (the writer aborted from the release lock logic). Thus, the reader (and possibly many other readers) waits forever (or times out), and the lock is left in an inconsistent state.

Such a scenario may be very rare, but failing to recognize and address it leads to an unstable lock not suitable for implementations requiring reliability, such as kernel-level implementations. To avoid this scenario, the releasing writers can repeatedly try to get or create the event until either the reader(s) disappear(s) (e.g., time out) or the event creation succeeds. In this way, consistency of the lock state is maintained even in the face of event creation failures.

Race Conditions Related to Time Outs

The synchronization avoids various race conditions related to timing out threads. For example, the following sequence illustrates a possible race condition between a signaling writer and a timing out reader:

1. The lock is held by a writer.
2. A reader attempts to acquire the lock and specifies a time out; the reader is forced to wait.
3. The writer calls a release lock function.
4. The writer sees the waiting reader and determines it needs to send a resume indication to the event on which the reader is waiting.
5. The time out period elapses.
6. The reader begins a time out sequence because the time out period has elapsed; the event on which the reader was waiting is reassigned or destroyed.

7. The writer sends a resume indication to the event on which the reader was waiting (the event has since been reassigned or destroyed).

Sending a resume indication to an event that has since been reassigned or destroyed risks putting the lock into an inconsistent state.

To avoid the illustrated race condition, a signal field is provided, and logic is incorporated into the time out sequence for the acquire reader lock function. The logic checks to see if the reader was signaled (even though the time out sequence has begun). If the reader has been signaled, it simply waits on the event rather than releasing the event for reassignment or destruction. Since the event is about to be sent a resume indication, the thread simply acquires the lock instead of timing out. Preferably, a one-bit signal field is maintained for both readers and writers and resides in the lock's inner state (e.g., 450). In this way, the signal can be set in conjunction with performing other modifications to the lock's state using an interlocked operation.

A similar condition can arise between a releasing reader and a timing out writer. By using signals, the lock state is maintained even in the face of these race conditions. The lock is thus suitable for use in kernel-level services or in services provided by an execution engine.

Optimistic Deadlock Avoidance Using Time Outs

As described earlier, deadlock can arise whenever at least two executing entities attempt to simultaneously hold locks on the same set of two or more resources. Table 3 shows an exemplary deadlock scenario involving two writers, $W_1$ and $W_2$ attempting to write to resources $D_1$ and $D_2$. $D_1$ is protected by Lock $L_1$, and $D_2$ is protected by Lock $L_2$.

TABLE 3

Deadlock Scenario

| Time | $W_1$'s action on $D_1$ | $W_1$'s action on $D_2$ | $W_2$'s action on $D_1$ | $W_2$'s action on $D_2$ |
|---|---|---|---|---|
| $T_1$ | request and acquire | | | request and acquire |
| $T_2$ | hold | request and wait | request and wait | hold |
| $T_3$ | hold | wait | wait | hold |
| $T_4$ | hold forever | wait forever | wait forever | hold forever |

Each of the writers requires access to both resources to accomplish its work. However, the first writer acquires the first resource and the second writer acquires the second resource at $T_1$; a deadlock scenario has begun. At $T_2$, each writer attempts to acquire the resource held by the other and is forced to wait. At $T_3$ and continuing forever at $T_4$, each writer holds a resource required by the other and waits for a resource held by the other. Thus, neither writer can accomplish its work.

By using time outs, the writers can implement an optimistic deadlock avoidance scheme. Table 4 illustrates a successful implementation of the scheme. Although processing begins as in the deadlock scenario of Table 3, at $T_5$, the waiting lock requests time out. After timing out at $T_7$, the writers release the lock they already acquired and sleep for a random period. At $T_8$, the first writer wakes and acquires the first lock while the second writer sleeps. Then, at $T_9$, the first writer acquires the second lock while the second writer sleeps. At $T_{10}$, the second writer finally wakes, but the first writer has already acquired the two locks. The first writer performs its work while the second writer waits. At $T_{11}$, the first writer releases the locks, allowing the second writer to acquire them. At $T_{12}$, the second writer can perform its work, and at $T_{13}$, the second writer releases both locks. Thus, deadlock has been avoided.

TABLE 4

Optimistic Deadlock Avoidance Success Scenario

| Time | $W_1$'s action on $L_1$ | $W_1$'s action on $L_2$ | $W_2$'s action on $L_1$ | $W_2$'s action on $L_2$ |
|---|---|---|---|---|
| $T_1$ | request and acquire | | | request and acquire |
| $T_2$ | hold | request and wait | request and wait | hold |
| $T_3$ | hold | wait | wait | hold |
| $T_4$ | hold | wait | wait | hold |
| $T_5$ | hold | time out | time out | hold |
| $T_6$ | release | none | none | release |
| $T_7$ | sleep | sleep | sleep | sleep |
| $T_8$ | request and acquire | none | sleep | sleep |
| $T_9$ | hold | request and acquire | sleep | sleep |
| $T_{10}$ | write to resource | write to resource | request and wait | none |
| $T_{11}$ | release | release | acquire | request and acquire |
| $T_{12}$ | | | write to resource | write to resource |
| $T_{13}$ | | | release | release |

The scheme is called optimistic because the logic behind the writers effectively makes an optimistic assumption that deadlock will not occur. Since the writers recover from potential deadlock situations via the timeout feature, there can be eventual progress and correctness of the lock logic is not affected. In many scenarios, deadlock is rare, and optimistic deadlock avoidance schemes tend to perform well under actual operating conditions. The logic for handling the time out condition may reside either in programming logic or the synchronization services.

Hybrid Spinlock

The lock object's 404 interface 445 as object 404 provides a method for initializing various defaults associated with the synchronization services. One default specifies the number of times to spin before waiting on an event object. Spinning refers to the practice of repeatedly checking the lock to see if it is available.

The default initialization method checks the number of processors on the system. If there is more than one processor present, the default spin count is set to a predetermined value (e.g., 500). Otherwise, the default spin count is set to 0. Logic in the synchronization services consults the default spin count when a thread attempts to acquire the lock. The default spin count may vary depending upon circumstances.

Avoiding Starvation

To avoid starvation of readers or writers, the synchronization services can alternate the lock between readers and writers. For example, when the writer lock is released, it is first passed to waiting readers. If there are no waiting readers, then the lock can be passed to another waiting writer.

Exemplary Implementation of Methods on a Lock Object

The synchronization services typically provide at least four functions performing operations implemented as methods on a lock object interface (e.g., the interface 445 of lock object 404 shown in FIG. 4). A function AcquireReaderLock( ) acquires a lock for reading operations. According to reader/writer semantics, multiple readers may acquire the lock in this manner if there are no writers. A function ReleaseReaderLock( ) releases the lock for a reader.

However, after one reader releases the lock, there may be other readers still holding the lock. A function AcquireWriterLock( ) acquires a lock for writing operations. According to reader/writer semantics, when this lock is held, no other threads (readers or writers) hold it. A function ReleaseWriterLock( ) releases the lock.

Thus, a programming object requiring reader/writer synchronization services may simply call the appropriate functions to acquire and release to lock. When the synchronization services indicate the lock has been successfully acquired, the object performs its work (e.g., reading or writing to the resource) and subsequently releases the lock. The interface 445 typically provides a variety of other methods, such as methods to initialize the lock or upgrade the lock.

Acquire Reader Lock

Figure 8A:
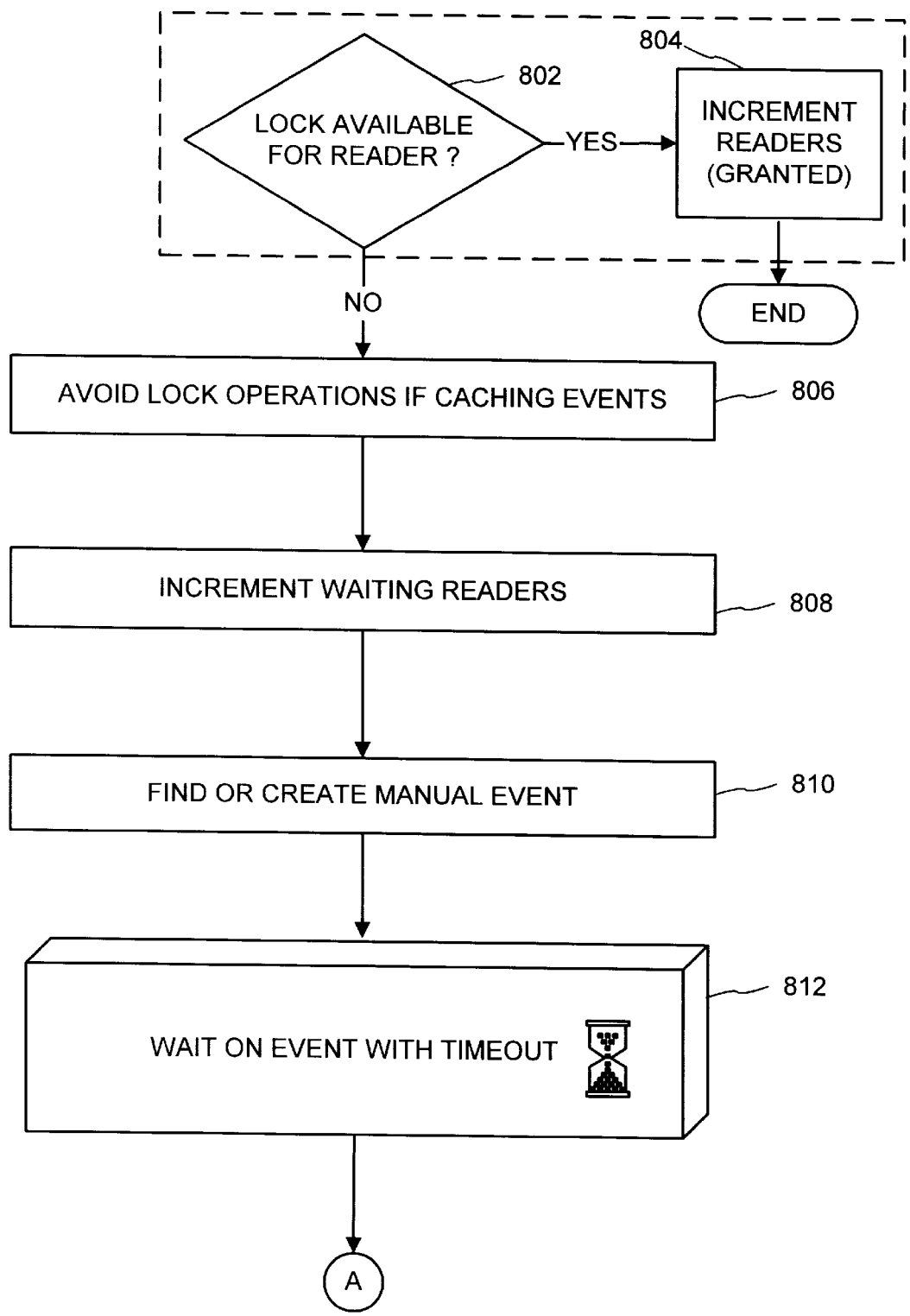
FIGS. 8A and 8B are a flowchart showing an exemplary acquire reader lock method.
Figure 8B:
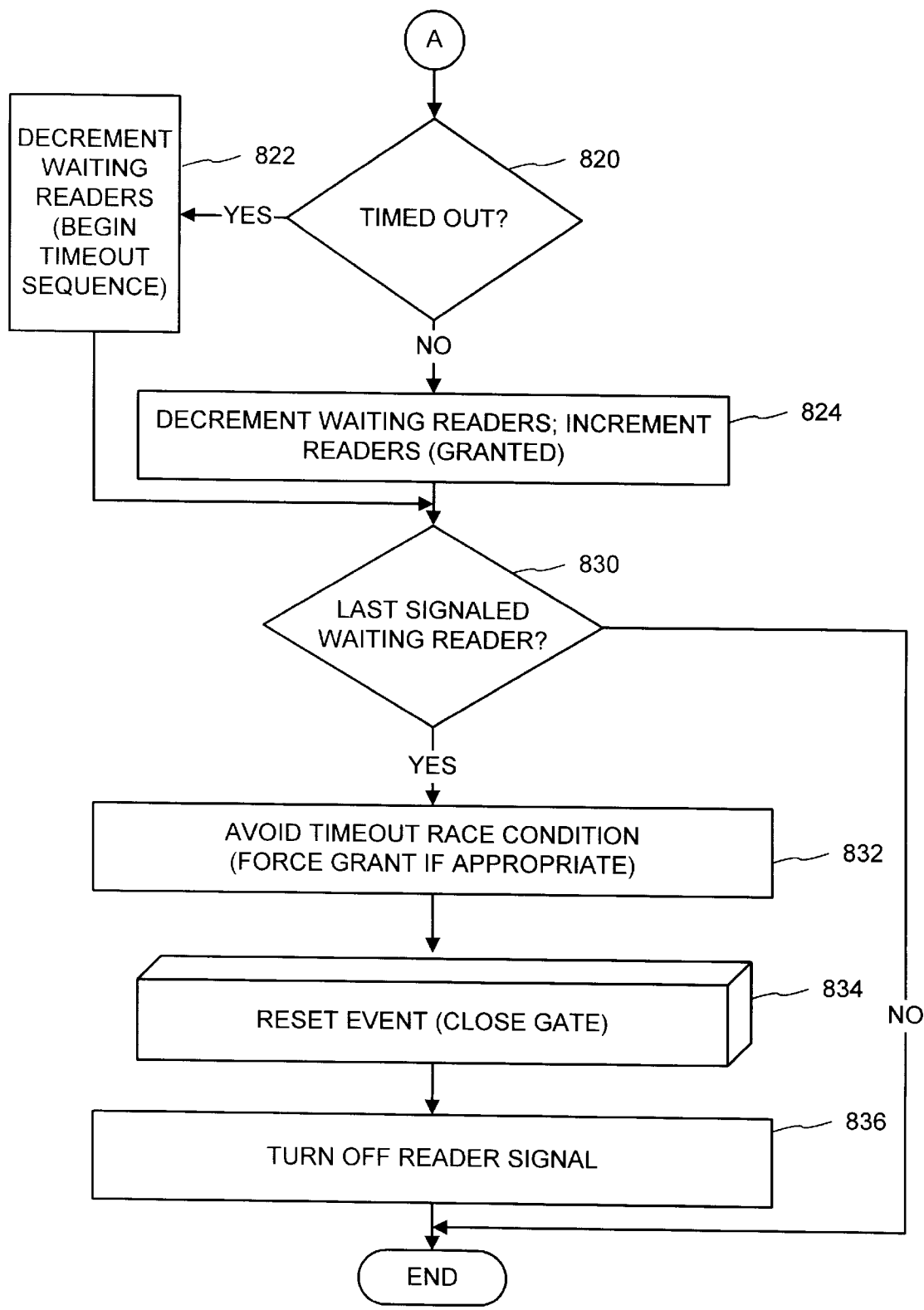

An exemplary.implementation of an acquire reader lock method is shown in FIGS. 8A and 8B. The method can accept a desired time out value. The method could, for example, be implemented in a callable method provided by interface 445 (FIG. 4) to be called by a thread that wishes to acquire the lock represented by the lock object 404 as a reader. The flowchart of FIGS. 8A and 8B omits some logic for the sake of brevity. For example, logic for nesting readers is not shown.

At 802, the logic checks if the lock is available for a reader (for example, if there are only readers and no writer holding the lock). If so, the reader count (e.g., readers 406) is incremented at 804 and the method ends. 802 and 804 are accomplished together with an interlocked operation, such as an atomic test and set instruction on a Pentium or Alpha processor.

If the lock is not available for a reader, the logic avoids lock operations if events are being cached at 806. For purposes of this flowchart, if either the writer and reader have been signaled (e.g., writer signaled 452D and reader signaled 452E are true), events are being cached. At 808, waiting readers (e.g., 414) is incremented. At 810 a manual event is found or created, and at 812, the logic waits on the event with the desired time out, if any. In other words, execution of the thread that requested the lock is typically suspended. In some instances, the event may have already been set (i.e., the gate is open), so execution would continue.

Upon resuming, at 820, it is determined whether the event timed out (sometimes called an "unsuccessful wait"). If the event timed out, a waiting readers value (e.g., 416) is decremented, beginning a time out sequence at 822. If the event did not time out, a waiting readers value is decremented and a readers value (e.g., 406) is incremented at 824; the lock has been granted. These updates to lock state are performed on the lock's inner state using an interlocked operation.

In either case, the logic checks to see if the instant requesting reader was the last signaled waiting reader at 830 (e.g., by checking reader signaled 408). If not, the method ends. However, if the instant requesting reader was the last signaled waiting reader, the race condition between a signaling writer and a timing out reader is avoided at 832. For example, the logic can grant the lock to the requesting reader, even though the time out sequence has begun.

At 834, the event on which the reader was waiting is reset (i.e., the gate is closed to any other readers), and at 836, the reader signaled value (e.g., 408) is turned off.

Release Reader Lock

Figure 9:
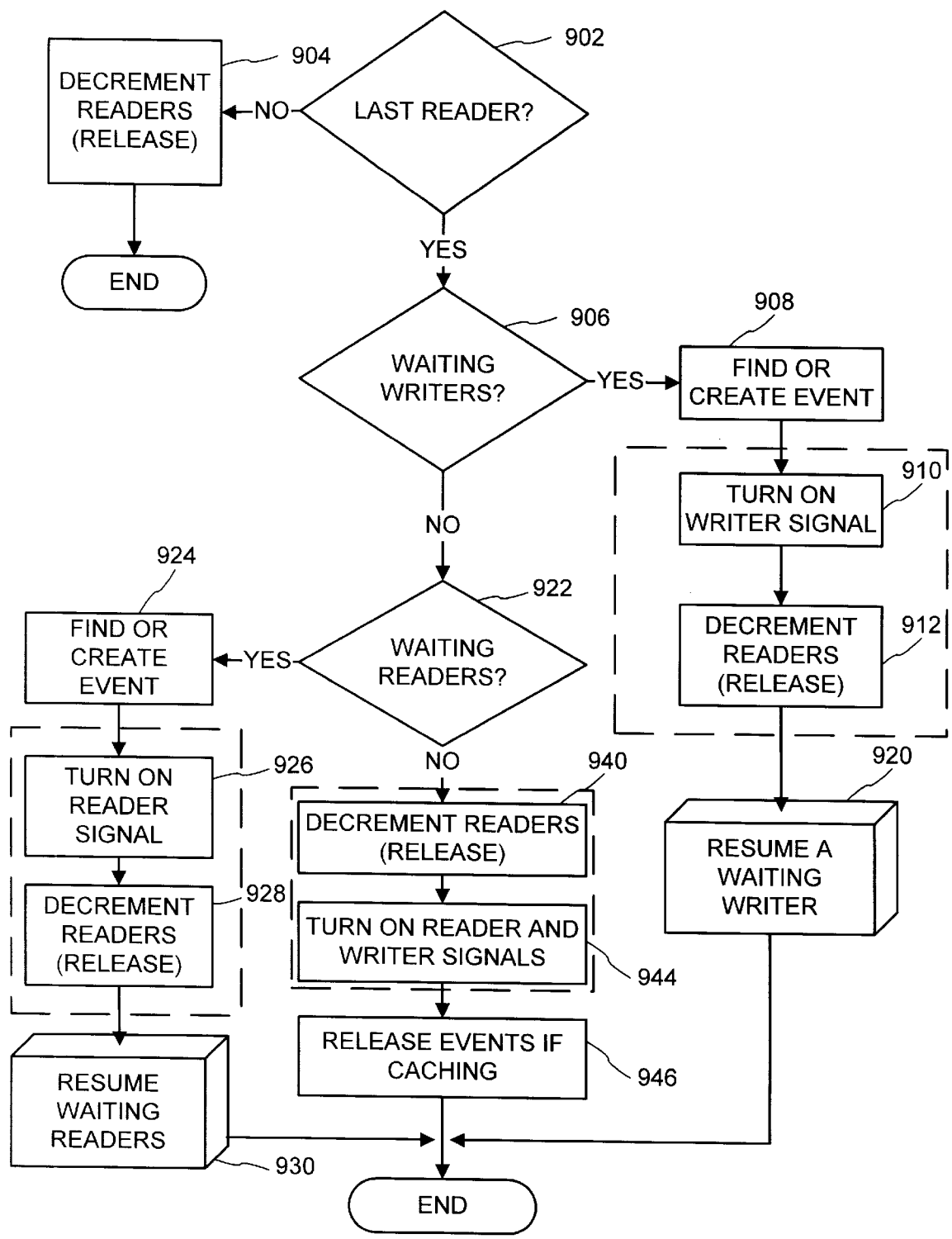
FIG. 9 is a flowchart showing an exemplary release reader lock method.

An exemplary implementation of a release reader lock method is shown in FIG. 9. The method could, for example, be implemented in a callable method provided by interface 445 (FIG. 4) to be called by a thread holding the lock represented by the lock object 404 that wishes to release the lock as a reader. The flowchart omits some logic for the sake of brevity. For example, logic for de-nesting readers is not shown.

At 902, the logic checks to see if the thread holding the lock is the last reader. If not, the readers value (e.g., 406) is decremented by one at 904 to release the lock for this reader (but is still held by other readers). The decrement is accomplished using an interlocked operation (e.g., an interlocked compare and exchange on the inner lock state 450).

If the thread holding the lock is the last reader, the logic checks to see if there are any waiting writers at 906. If so, an automatic event is found or created at 908 (avoiding the race of two concurrently-executing entities trying to create an event). Then, the writer signaled value (e.g., 412) is turned on at 910, and the readers (e.g., 406) is decremented by one at 912 to release the lock. 910 and 912 are accomplished using an interlocked operation. Then a waiting writer is resumed (via the event) at 920.

If there were no waiting writers, the logic checks if there were any waiting readers at 922. If so, a manual event is found or created at 924 (avoiding the race of two concurrently-executing entities trying to create an event). The reader signaled value (e.g., 408) is turned on at 926 and the readers value (e.g., 406) is decremented by one at 928 to release the lock. 926 and 928 are performed using an interlocked operation. Then the waiting readers are reumed (via the event) at 930.

If there were no waiting readers, the logic decrements the readers value (e.g., 406) at 940 to release the lock. At 944, the reader and writer signaled values (e.g., 408 and 412) are turned on to indicate event caching operations are about to be performed. 940 and 944 are performed using an interlocked operation. The events can then be released if they are being cached at 946. The event release function turns the signals off.

Acquire Writer Lock

Figure 10:
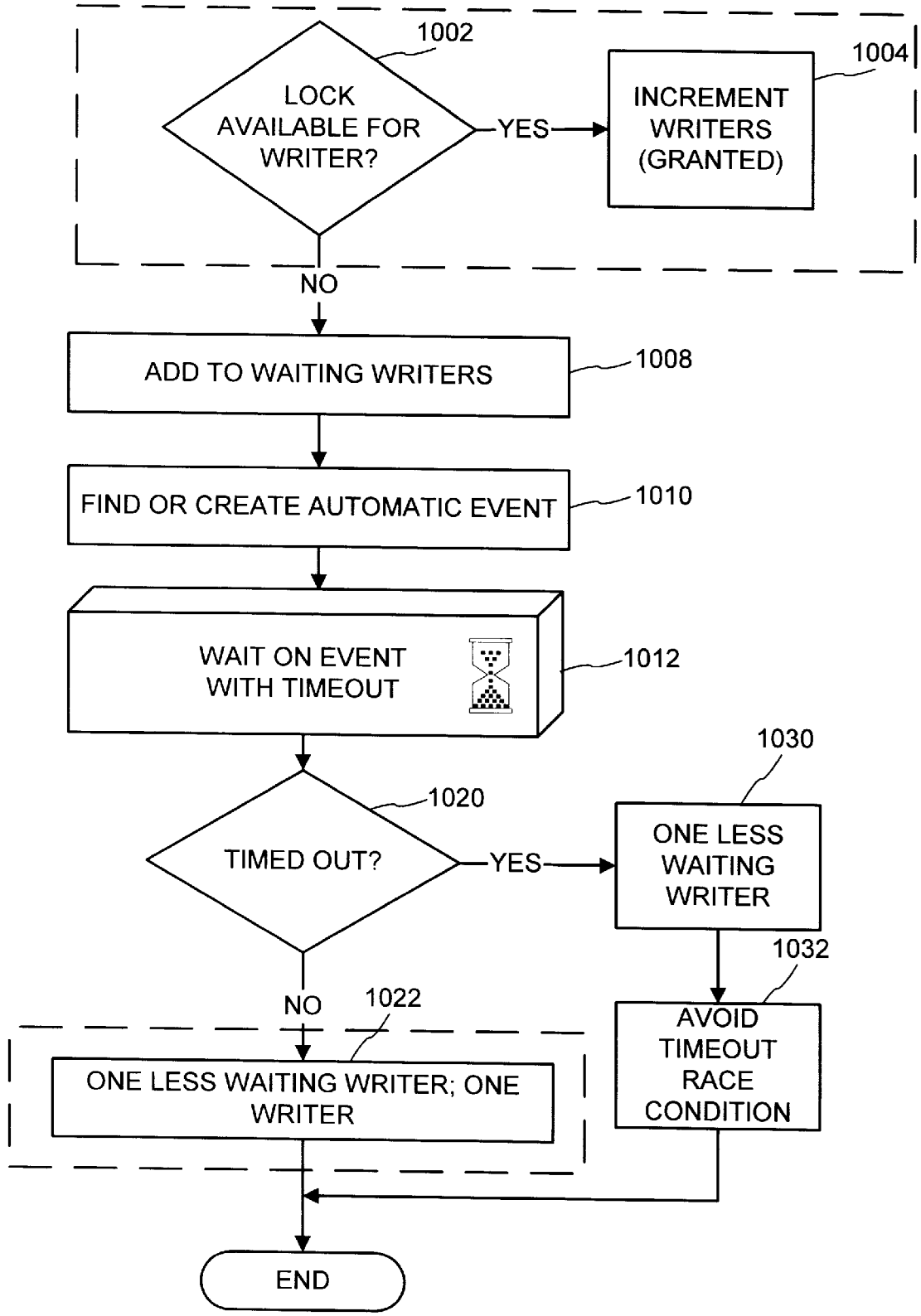
FIG. 10 is a flowchart showing an exemplary acquire writer lock method.

An exemplary implementation of an acquire reader lock method is shown in FIG. 10. The method can accept a desired time out value. The method could, for example, be implemented in a callable method provided by interface 445 (FIG. 4) to be called by a thread that wishes to acquire the lock represented by the lock object 404 as a reader. The flowchart of FIG. 10 omits some logic for the sake of brevity. For example, logic for nesting writers is not-shown.

At 1002, the logic checks to see if the lock is available for a writer (i.e., there are not readers or writers holding the lock). If so, the writer value (e.g., 410) is incremented at 1004 to grant the lock. 1002 and 1004 are implemented together as an interlocked operation.

If the lock was not available, the waiting writers value (e.g., 416) is incremented at 1008. An automatic event is found or created at 1010, and the thread then waits on the event with the specified time out, if any at 1012. Upon resurning, the logic checks to see if the wait timed out at 1020. If not, the waiting writers value (e.g., 416) is decremented and the writer value (e.g., 410) is set to one at 1022 with an interlocked instruction (e.g., to modify the inner state 450).

If the wait timed out, the waiting writers value (e.g., 416) is decremented at 1030. And a time out race condition is avoided at 1032 (e.g., by checking writer signaled 412). Specifically, the race condition is similar to that described for readers at 832. For example, the logic can grant the lock to the requesting writer, even though a time out sequence has begun.

Release Writer Lock

Figure 11:
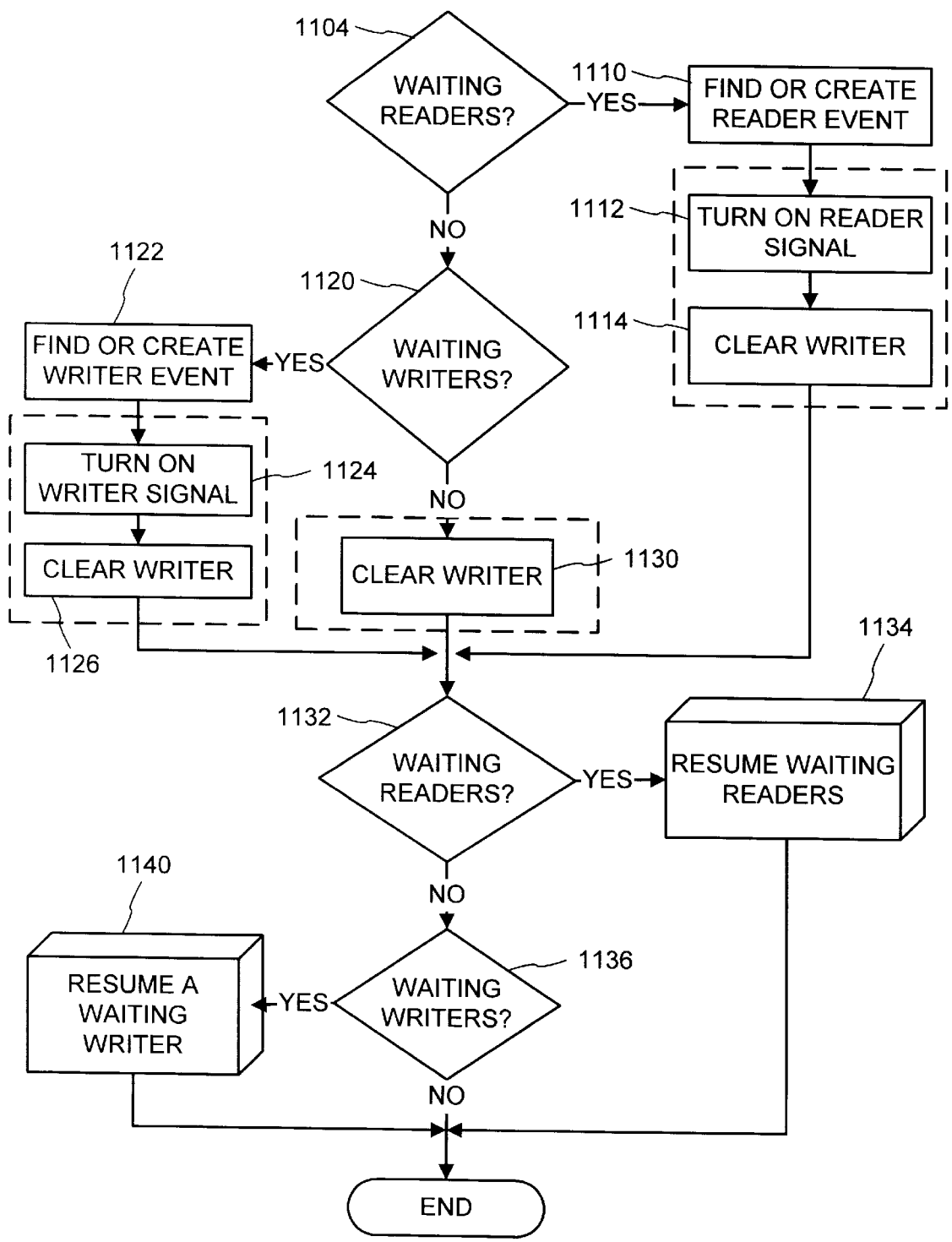
FIG. 11 is a flowchart showing an exemplary release writer lock method.

An exemplary implementation of a release writer lock method is shown in FIG. 11. The method could, for example, be implemented in a callable method provided by interface 445 (FIG. 4) to be called by a thread holding the lock represented by the lock object 404 that wishes to release the lock as a reader. The flowchart omits some logic for the sake of brevity. For example, logic for de-nesting writers is not shown.

At 1104, the logic checks if there are any waiting readers. If so, a manual event is found or created at 1110 (avoiding the race of two concurrently-executing entities trying to create an event). At 1112, the reader signal (e.g., reader signaled 408) is turned on. At 1114, the writer (e.g., writer 410) is cleared. 1112 and 1114 are performed together with an interlocked instruction. Execution then branches to box 1132.

If there were no waiting readers, the logic checks if there are any waiting writers at 1120. If so, an automatic event if found or created at 1122 (avoiding the race of two concurrently-executing entities trying to create an event). At 1124, the reader signal is turned on. At 1126, the writer is cleared. 1124 and 1126 are performed together with an interlocked instruction. Execution then branches to box 1132.

If there were no waiting writers, the writer is cleared at 1130 (with an interlocked instruction). At 1132, it is determined whether there are any waiting readers. If so, the event from 1110 is sent a resume indication at 1134. If there are no waiting readers, it is determined whether there are any waiting writers at 1136. If so, the event from 1112 is sent a resume indication at 1140.

Alternate Description of Release Writer Lock Functionality

An alternate way of describing a release writer method is shown at FIG. 12. Initially, the lock's inner state (e.g., 450) can be read into a temporary variable; the temporary variable is saved in an old value variable for later comparison when updating the lock's state. At 1202, notation is made that there will be no writer, since this writer is releasing the lock. The notation (and other notations indicated in the later-described steps) is made by modifying the temporary variable. At 1204, the logic checks if there are any waiting readers. If so, a reader event is found or created at 1210 (avoiding the race of two concurrently-executing entities trying to create an event) and a notation is made that the waiting reader is being signaled at 1212.

If there were no waiting readers, the logic checks if there are any waiting writers at 1220. If so, an event if found or created at 1222 (avoiding the race of two concurrently-executing entities trying to create an event), and a notation is made that the waiting writer is being signaled at 1224.

The lock's inner state (e.g., 450) is updated at 1230 using an interlocked operation (e.g., to determine if the lock's inner state has changed since it was examined) using the old value variable as a comparand and the temporary variable as the exchange (i.e., proposed) value. If the update fails, the steps can be started over again, including setting the temporary variable to the lock's state. After successfully updating the state, it is determined whether there are any waiting readers at 1232. If so, the event from 1210 is sent a resume indication at 1234. If there are no waiting readers, it is determined whether there are any waiting writers at 1236. If so, the event from 1212 is sent a resume indication at 1140.

Alternate Description of Release Reader Lock Functionality

Figure 13A:
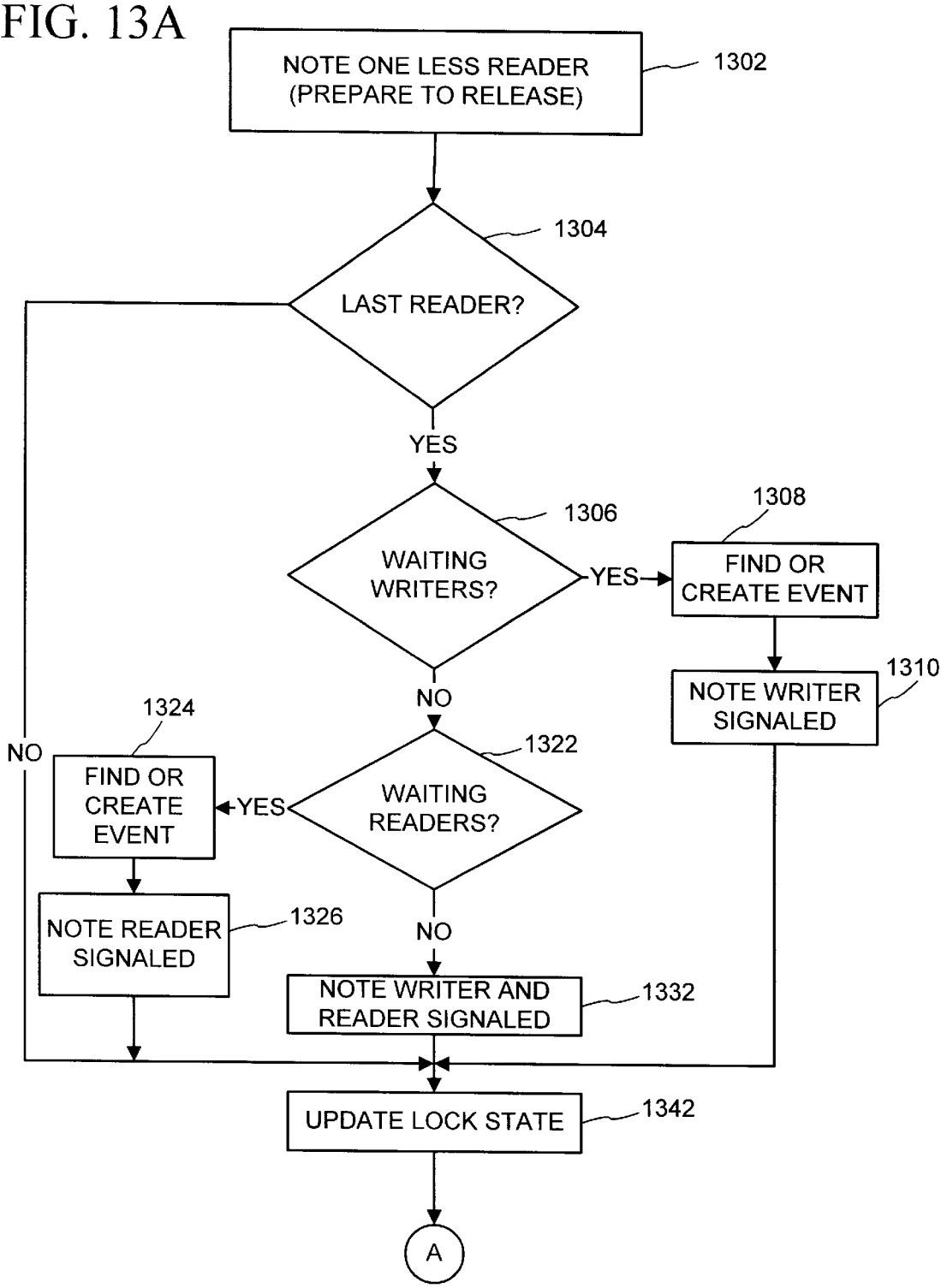
FIGS. 13A and 13B are a flowchart showing an alternative exemplary release reader lock method.
Figure 13B:
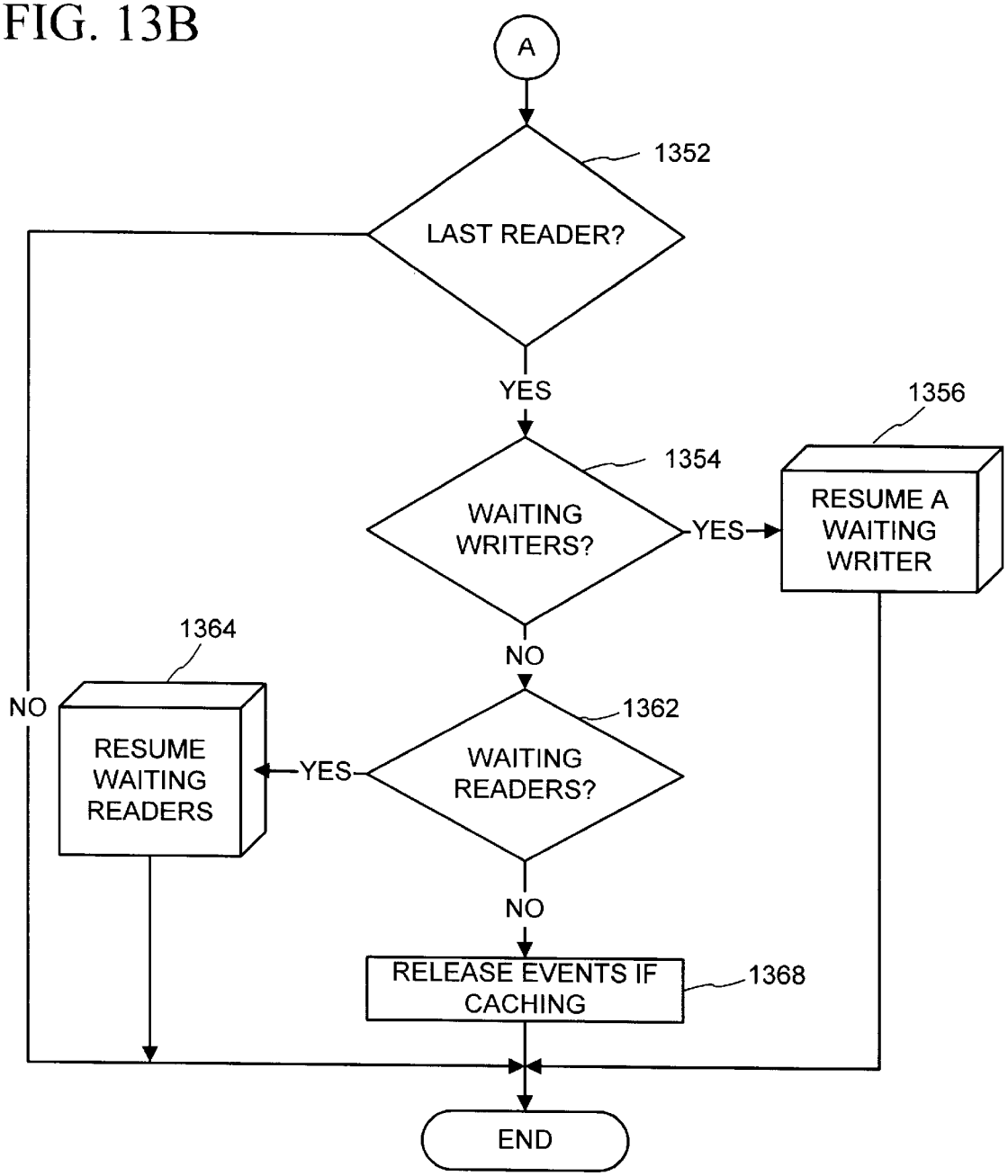

An alternate way of describing a release reader method is shown at FIGS. 13A and 13B. Initially, the lock's inner state (e.g., 450) can be read into a temporary variable; the temporary variable is saved in an old value variable for later comparison when updating the lock's state.

At 1302 (13A), notation is made that there will be one less reader, since this reader is releasing the lock. The notation (and other notations indicated in the later-described steps) is made by modifying the temporary variable. At 1304, the logic checks if the reader is the last reader (i.e., if this is the only thread holding the lock). If not, the logic continues at 1342 as described below. If so, the logic checks to see if there are any waiting writers at 1306. If so, an automatic event is found or created at 908 (avoiding the race of two concurrently-executing entities trying to create an event). Then, a notation is made at 1310 that a writer is being signaled, and the logic continues at 1342 as described below.

If there are no waiting writers, the logic checks if there are any readers waiting on the lock at 1322. If so, a manual event is found or created at 1324 (avoiding the race of two concurrently-executing entities trying to create an event). A notation is made at 1326 that a reader is being signaled.

The logic then continues at 1342 by updating the lock's inner state (e.g., 450) via an interlocked operation, such as an interlock compare and exchange (e.g., to determine if the lock's inner state has changed since it was examined) using the old value variable as a comparand and the temporary variable as the exchange (i.e., proposed) value. If the update fails, the steps can be started over again, including setting the temporary variable to the lock's state. After successfully updating the state, the lock continues at 1352 (13B).

At 1352, the logic checks if the releasing reader is the last reader. If not, the method ends. If so, the logic checks at 1354 if there are any writers waiting on the lock. If so, a waiting writer is resumed (via the event of 1308) at 1356. If there were no waiting writers, the logic checks at 1362 if there are any readers waiting on the lock. If so, they are resumed (via the event of 1324) at 1364. If there were no waiting readers, events are released if they are being cached at 1368. The event release function turns the signals off.

Alternative Implementations

The various features described as part of the synchronization services can be combined in a variety of permutations. For example, some of the features for componentized software could be implemented with or without the time out feature. Similarly, some of the data structures shown in FIG. 4 could be omitted in a scaled-down version of the lock using event objects and time outs.

Having described and illustrated the principles of our invention with reference to illustrated embodiments, it will be recognized that the illustrated embodiments can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

Exemplary Implementation in Source Code

The source code listing included in the computer program listing appendix file "source-txt" is an exemplary implementation of concurrency-safe reader/writer synchronization i.e., services supporting timeouts. In the exemplary implementation a linked-list of lock structures (i.e., RWLocks) the thread has acquired is maintained in the thread local storage. The exemplary implementation reuses the thread local storage data structures efficiently and increases size only when needed. The exemplary implementation is able to check for the fast path case (e.g., when acquiring the lock as a reader) by examining the thread-local storage.

We claim:

1. In a computer system, a method of granting a lock to a set of a plurality of concurrently-executing entities, the method comprising:

receiving a request of a first executing entity out of the set requesting the lock as a reader;

responsive to said receiving the request of a first executing entity requesting the lock as a reader, determining that no executing entities hold the lock as a writer;

responsive to said determining that no executing entities hold the lock as a writer, granting the lock to the first executing entity as a reader, wherein said determining that no executing entities hold the lock as a writer and granting the lock to the first executing entity are performed together with an interlocked operation;

receiving a request of a second executing entity out of the set requesting the lock as a writer;

responsive to said receiving the request of a second executing entity requesting the lock as a writer, determining that no executing entities hold the lock as a writer and no executing entities hold the lock as a reader; and responsive to said determining that no executing entities hold the lock as a writer and no executing entities hold the lock as a reader, granting the lock to the second executing entity as a writer, wherein said determining that no executing entities hold the lock as a writer and no executing entities hold the lock as a reader and granting the lock to the second executing entity are performed together with an interlocked operation.

2. A computer-readable medium having computer-executable instructions for performing the steps of claim 1.

3. The method of claim 1 wherein the interlocked operations each are an interlocked compare and exchange operation.

4. The method of claim 1 wherein the interlocked operations each are an instruction native to a processor of the computer system.

5. The method of claim 1 wherein the first executing entity is a first thread executing in a process, and the second executing entity is a second thread executing in the process.

6. The method of claim 1 wherein the lock is represented by a data structure comprising a readers value and a writers value, and the interlocked operations are performed on the readers value and the writers value.

7. The method of claim 1 further comprising:

responsive to a request from a requesting executing entity out of the set for the lock, determining that the lock is not available for granting;

responsive to said determining that the lock is not available for granting, suspending execution of the requesting executing entity until a time out period expires;

after the time out period expires, determining that an executing entity out of the set has signaled the requesting executing entity after the time out period expired; and responsive to said determining that an executing entity out of the set has signaled the requesting executing entity after the time out period expired, granting the lock to the requesting executing entity.

8. The method of claim 1 further comprising:

responsive to a request from a requesting executing entity out of the set for the lock, determining that the request cannot currently be granted; and responsive to said determining that the request cannot currently be granted, suspending execution of the requesting executing entity out of the set.

9. The method of claim 8 wherein said suspending is performed by forcing the requesting executing entity to wait on an execution suspension mechanism to which a resume indication can be sent to resume execution of the requesting executing entity.

10. The method of claim 9 further comprising:

when releasing a lock held by a writer, resuming a plurality of readers waiting on the execution suspension mechanism.

11. The method of claim 9 wherein the lock is represented by a data structure comprising a waiting field, the method further comprising:

storing a reference to the execution suspension mechanism in the waiting field.

12. The method of claim 11 wherein said storing is performed with an interlocked instruction on the waiting field.

13. The method of claim 9 further comprising:

creating the execution suspension mechanism, wherein said creating is delayed until after the receiving the request of the requesting executing entity.

14. The method of claim 9 further comprising:

creating the execution suspension mechanism, wherein said creating is performed responsive to receiving the request of the requesting executing entity.

15. The method of claim 9 further comprising:

retrieving the execution suspension mechanism from a pool of at least one execution suspension mechanism previously used to suspend execution of one of the executing entities out of the set of executing entities.

16. The method of claim 9 wherein said suspending is performed by forcing the requesting executing entity to wait on an event object operable to be sent an indication to resume execution of the requesting executing entity.

17. The method of claim 16 wherein the event object is selected to be a manual event object for a requesting executing entity requesting the lock as a reader.

18. The method of claim 16 wherein the event object is selected to be an automatic event object for a requesting executing entity requesting the lock as a writer.

19. The method of claim 16 wherein the lock is held by a holding executing entity, the method further comprising:

when the holding executing entity releases the lock, resuming the requesting executable entity via the event to grant the lock to the requesting executing entity.

20. The method of claim 19 wherein the lock is a first lock, the method further comprising:

after said resuming, releasing the event to free computing resources; and after said releasing, creating an event object, wherein the event object is created responsive to lock contention on a lock other than the first lock.

21. The method of claim 9 further comprising:

receiving a request of the second executing entity to release the lock as a writer;

responsive to said receiving a request of the second executing entity to release the lock, determining that there is at least one executing entity other than the second executing entity waiting for the lock and no event suspension mechanism has been created for the at least one executing entity;

responsive to said determining that there is at least one executing entity other than the second executing entity waiting for the lock and no event suspension mechanism has been created for the at least one executing entity, attempting to create an execution suspension mechanism;

determining that said attempting to create has failed while there is at least one executing entity other than the second executing entity waiting for the lock and no event suspension mechanism has been created for the at least one executing entity; and responsive to determining that said attempting to create has failed, repeating said attempting to create until an execution suspension mechanism has been created.

22. The method of claim 8 wherein the lock's availability is represented by a data structure, the method further comprising:

responsive to a request from a requesting executing entity out of the set for the lock, spinning on the data structure a plurality of times before said suspending execution of the requesting executing entity out of the set.

23. The method of claim 8 further comprising:

after a time out period has elapsed, resuming execution of the requesting executing entity out of the set even though the request still cannot be granted.

24. The method of claim 23 further comprising:

providing an indication to the requesting executing entity that the request has timed out.

25. The method of claim 24 wherein the lock is a first lock and the requesting executing entity holds a second lock, the method further comprising:

responsive to the indication that the request has timed out, releasing the second lock to avoid a deadlock condition.

26. The method of claim 25 further comprising:

after releasing the second lock, reacquiring with the requesting entity the first lock and the second lock.

27. The method of claim 1 further comprising:

receiving a request of a third executing entity out of the set requesting the lock subject to a time out;

responsive to said receiving a request of a third entity, determining that the lock is not available to the third executing entity;

responsive to said determining that the lock is not available to the third executing entity, suspending execution of the third entity; and after suspending execution of the third entity, resuming execution of the third entity after a time out period expires.

28. The method of claim 1 further comprising:

while the second executing entity holds the lock as a writer, receiving a request from the second executing entity for the lock as a reader; and responsive to determining that the second executing entity holds the lock as a writer, granting the request from the second executing entity for the lock as a reader.

29. The method of claim 1 further comprising:

while the second executing entity holds the lock as a writer, receiving a request from the second executing entity for the lock as a reader; and responsive to determining that the second executing entity holds the lock as a writer, transforming the request from the second executing entity for the lock as a reader into a request for the lock as a writer.

30. The method of claim 29 wherein the request from the second executing entity for the lock as a writer results from logic in a first component and the request from the second executing entity for the lock as a reader results from logic in a second component called by the first component.

31. The method of claim 1 wherein the request by the first executing entity is a first request, the method further comprising:

tracking a reader nesting count for the first executing entity, wherein the reader nesting count indicates how many unreleased requests for the lock as a reader have been granted to the first executing entity;

after granting the first request and before the first request is released, receiving a second request of the first executing entity requesting the lock as a reader;

consulting the reader nesting count to determine there is at least one unreleased request for the lock as a reader; and responsive to said consulting, granting the second request of the first executing entity and increasing the nesting count.

32. The method of claim 31 wherein the reader nesting count resides in storage local to the first executing entity.

33. The method of claim 31 wherein the first executing entity is a thread and the reader nesting count resides in thread local storage of the thread.

34. The method of claim 31 wherein the first executing entity is a thread associated with a thread local storage, and the thread local storage stores a thread local data structure having a reference to a data structure representing the lock and a reader nesting count, the method further comprising:

checking the thread local data structure to determine if a fast path is available to acquire the lock as a reader; and responsive to determining the fast path is available, taking the fast path to acquire the lock as a reader.

35. The method of claim 31 wherein the request by the second executing entity is a third request, and an identifier of the second executing entity identifies the identity of the second executing entity, the method further comprising:

tracking a writer nesting count, wherein the writer nesting count indicates how many unreleased requests for the lock as a writer have been granted;

after granting the third request and before the third request is released, receiving a fourth request of the second executing entity requesting the lock as a writer;

consulting an identifier of the second executing entity to determine there is at least one unreleased request for the lock as a writer by the second executing entity; and responsive to said consulting, granting the fourth request of the second executing entity and increasing the writer nesting count.

36. The method of claim 35 wherein the writer nesting level is a field residing in a data structure representing the lock.

37. The method of claim 1 further comprising:

for the lock, tracking a writer sequence number, wherein the writer sequence number is modified upon grant of the lock to one of the executing entities out of the set as a writer.

38. The method of claim 1 further comprising:

granting a request from a requesting executing entity for the lock;

after granting the request from the requesting executing entity, receiving a request from the requesting executing entity to alter the granted request;

responsive to said request to alter the granted request, granting the request to alter the granted request; and responsive to said request to alter the granted request, providing an indication of whether an executing entity out of the set other than the requesting executing entity held the lock as a writer after receiving the request to alter and before granting the request to alter.

39. The method of claim 38 further comprising:

tracking a writer sequence number for the lock; and determining that an executing entity out of the set other than the requesting executing entity held the lock as a writer after receiving the request to alter and before granting the request to alter by comparing a value of the writer sequence number when receiving the request to a value of the writer sequence number when granting the request.

40. The method of claim 1 further comprising:

receiving a request from the first executing entity to upgrade the request for the lock as a reader to a request for the lock as a writer; and responsive to said request to upgrade, granting the request to upgrade and providing an indication of whether an executing entity out of the set other than the first executing entity held the lock as a writer after the request to upgrade and before granting the request to upgrade.

41. The method of claim 1 further comprising:

receiving a request from the second executing entity to downgrade the request for the lock as a writer to a request for the lock as a reader; and responsive to said request to downgrade, granting the request to downgrade and providing an indication of whether an executing entity out of the set other than the second executing entity held the lock as a writer after the request to downgrade and before granting the request to downgrade.

42. The method of claim 1 further comprising:

granting a request from a requesting executing entity out of the set for the lock;

after granting the request for the lock, receiving a request from the requesting executing entity to suspend the granted request;

responsive to said request to suspend the granted request, suspending the granted request;

after said suspending, receiving a request from the requesting executing entity to restore the granted request; and responsive to said request to restore the granted request, providing an indication of whether an executing-entity out of the set other than the requesting executing entity held the lock as a writer after suspending the granted request and before granting the request to restore.

43. In a computer system, a method of protecting at least one protected resource during operations on the at least one protected resource by a set of a plurality of concurrently-executing entities, the method comprising:

receiving a request of a first executing entity out of the set requesting protection for a read operation on the at least one protected resource;

responsive to said receiving the request of the first executing entity requesting protection for a read operation, granting the request of the first executing entity responsive to determining that no granted request to an executing entity out of the set for a modify operation on the at least one protected resource has not yet been released, wherein said granting the request of the first executing entity and said determining that no granted request to an executing entity out of the set for a modify operation on the at least one protected resource has not yet been released are performed together with an interlocked operation;

receiving a request of a second executing entity out of the set requesting protection for a modify operation on the at least one protected resource; and responsive to said receiving the request of the second executing entity requesting protection for a modify operation, granting the request of the second executing entity responsive to determining that no granted request to an executing entity out of the set for a read operation on the at least one protected resource has not yet been released and no granted request to an executing entity out of the set for a modify operation on the at least one protected resource has not yet been released, wherein said granting the request of the second executing entity and said determining that no granted request to an executing entity out of the set for a read operation has not yet been released and no granted request to an executing entity out of the set for a modify operation are performed together with an interlocked operation.

44. A computer-readable medium having computer-executable instructions for performing the steps of claim 43.

45. In a computer system, a method of protecting at least one protected resource during operations on the at least one protected resource by a set of a plurality of concurrently-executing entities, the method comprising:

receiving a request of a first executing entity out of the set requesting protection for a read operation on the at least one protected resource;

responsive to receiving the request of the first executing entity requesting protection for a read operation, determining that the at least one protected resource can be protected for reading by the first executing entity;

responsive to said determining that the at least one protected resource can be protected for reading by the first executing entity, granting the request of the first executing entity for protection for a read operation on the at least one protected resource;

after the request for protection for a read operation has been granted and before the protection for a read operation has been released, receiving a request of a second executing entity requesting protection for a modify operation on the at least one protected resource;

determining that the second executing entity requesting protection for a modify operation has requested protection for a modify operation after the request for protection for a read operation has been granted and before the protection for a read operation has been released;

responsive to said determining that the second executing entity has requested protection for a modify operation, suspending execution of the second executing entity requesting protection for a modify operation to wait for the protection for a read operation to be released until a time out period has expired; and before the protection for a read operation has been released, responsive to determining that the time out period has expired, executing a time out sequence comprising resuming execution of the second executing entity requesting protection for a modify operation,
wherein said determining that the at least one protected resource can be protected for reading by the first executing entity and said granting the request of the first executing entity for protection for a read operation on the at least one protected resource are performed simultaneously with an interlocked operation.

46. The method of claim 45 wherein logic for both said determining that the at least one protected resource can be protected for reading by the first executing entity and said granting the request of the first executing entity for protection for a read operation on the at least one protected resource consists of a single interlocked operation.

47. The method of claim 45 further comprising:
after granting the request of the first executing entity for protection for a read operation and before receiving the request of a second executing entity requesting protection for a modify operation, receiving a request of a third executing entity out of the set requesting protection for a read operation on the at least one protected resource; and
responsive to said receiving the request of the third executing entity requesting protection for a read operation, after granting the request of the first executing entity for protection for a read operation and before receiving the request of a second executing entity requesting protection for a modify operation, determining that the at least one protected resource can be protected for reading by the third executing entity; and
responsive to said determining that the at least one protected resource can be protected for reading by the third executing entity, granting the request of the third executing entity for protection for a read operation on the at least one protected resource;
wherein said determining that the at least one protected resource can be protected for reading by the third executing entity and said granting the request of the third executing entity for protection for a read operation on the at least one protected resource are simultaneously performed with an interlocked operation.

48. In a computer system having a plurality of executing threads and a plurality of protected resources, a method of avoiding deadlock in a deadlock avoidance scheme, the method comprising:
tracking how many threads are reading each protected resource and whether a thread is writing to each protected resource in locks having per-lock data structures;
whenever a first thread is unable to acquire a first lock protecting a first resource due to contention on the first lock, blocking the first thread on an event, specifying a time out period;
if contention on the lock has not ceased after the time out period, timing out on the event to unblock the first thread;
after unblocking the first thread, releasing, with the first thread, a lock on a second protected resource; and
waiting for a sleep period to allow a thread other than the unblocked thread to access the first protected resource and the second protected resource, thereby avoiding deadlock.

49. The method of claim 48 further comprising:
performing an interlocked operation on the data structure of the first lock to grant the first lock to the first thread.

50. In a computer system, a method of providing reader/writer synchronization services to a set of a plurality of threads via a lock, the method comprising:
allowing a plurality of the threads to simultaneously hold the lock as a reader; and
preventing any of the of the plurality of the threads from holding the lock as a writer while any other of the plurality of the threads holds the lock as a reader, wherein said preventing any of the of the plurality of the threads from holding the lock as a writer while any other of the plurality of the threads holds the lock as a reader comprises observing failure of an interlocked operation; and
preventing any of the plurality of the threads to hold the lock as a writer while any other of the plurality of the entities holds the lock as a writer, wherein said preventing any of the plurality of the threads to hold the lock as a writer while any other of the plurality of the entities holds the lock as a writer comprises observing failure of an interlocked operation.

51. The method of claim 50 further comprising:
resuming execution of a thread waiting on the lock after a time out period has expired.

52. The method of claim 51 further comprising:
providing an indication to the thread waiting on the lock that a time out period has expired.

53. In a computer system, a method of altering a reader/writer lock's state to release the lock, wherein the lock is acquirable by a set of reading executing entities and a set of writing executing entities and the lock's state comprises an is-there-a-writer field, a reader-signaled field, and a writer-signaled field, the method comprising:
reading the lock state into a temporary variable, wherein the temporary variable comprises an is-there-a-writer field and a waiter-signaled field;
storing the temporary variable into an old value variable;
altering the is-there-a-writer field of the temporary variable to indicate there will be no writer holding the lock;
determining whether there is at least one reading executing entity waiting on the lock;
responsive to determining that there is at least one reading executing entity waiting on the lock, altering the reader-signaled field of the temporary variable to indicate the at least one reading entity is being signaled;
if there is not at least one reading executing entity waiting on the lock, determining whether there is at least one writing executing entity waiting on the lock;
if there is not at least one reading executing entity waiting on the lock, responsive to said determining that there is at least one writing executing entity waiting on the lock, altering the writer-signaled field of the temporary variable to indicate the at least one writing entity is being signaled; and
updating the lock's state with an interlocked instruction, specifying the old value variable as a comparand and the temporary variable as an exchange value.

54. The method of claim 53 further comprising
after altering the reader-signaled field of the lock's state, and after a time out period has expired, resuming execution of a timing out executing entity;
determining that the reader-signaled field of the lock's state has been altered; and
responsive to said determining that the reader-signaled field of the lock's state has been altered, granting the lock to the timing out executing entity.

55. In a computer system, a lock object for providing reader/writer synchronization services to a set of a plurality of executing entities, the lock object comprising:

a readers field for tracking how many executing entities out of the set currently hold the lock as a reader;

a writer field indicating whether an executing entity out of the set currently holds the lock as a writer;

a callable method for receiving a request to hold the lock as a reader, the callable method comprising performing an interlocked operation on the readers field and the writers field to grant the request to hold the lock as a reader; and a callable method for receiving a request to hold the lock as a writer, the callable method comprising performing an interlocked operation on the writer field and the reader field to grant the request to hold the lock as a writer.

56. The lock object of claim 55 further comprising:

a callable method for altering a granted request to hold the lock, wherein the callable method for altering provides an indication of writers intervening before the granted request is altered.

57. The lock object of claim 55 further comprising:

a callable method for upgrading a granted request to hold the lock as a reader to a request to hold the lock as a writer, wherein the callable method for upgrading provides an indication of writers intervening before the granted request is upgraded.

58. The lock object of claim 55 further comprising:

a callable method for suspending holding the lock; and a callable method for resuming holding the lock, wherein the callable method for resuming provides an indication of writers intervening before holding the lock is resumed.

59. In a computer system, a synchronization service comprising:

the lock object of claim 55; and a field stored local to an executing entity indicating a reader nest level for the executing entity.

60. In a computer system, a synchronization service comprising:

the lock object of claim 55; and at least one event object on which the lock object forces an executing entity out of the set to wait until a request for protection of the resource can be granted.

61. The synchronization service of claim 60 wherein the at least one event object supports a time out.

62. The lock object of claim 55 wherein the callable method for receiving a request to protect the resource during a modify operation on the resource is called by a requesting executing entity and comprises spinning the request before suspending execution of the executing entity.

63. In a computer system, a lock object for providing reader/writer synchronization services to a set of a plurality of components executing on a thread, the lock object comprising:

a readers field for tracking how many executing entities out of the set currently hold the lock as a reader;

a writer field indicating whether an executing entity out of the set currently holds the lock as a writer;

a callable method for receiving a request from a first component out of the set to hold the lock as a reader, the callable method comprising performing an interlocked operation on the readers field and the writers field to grant the request to hold the lock as a reader, wherein the callable method for receiving a request to hold the lock as a reader maintains a reader nest level field for each thread, wherein the reader nest level tracks how many unreleased grants of the lock have been made to a thread as a reader, the callable method operable for receiving a request to hold the lock as a reader from a component called by the first component and responsive to said call to increase the reader nest level; and a callable method for receiving a request to hold the lock as a writer, the callable method comprising performing an interlocked operation on the writer field and the reader field to grant the request to hold the lock as a writer, wherein the callable method for receiving a request to hold the lock as a writer maintains a writer nest level, wherein the writer nest level tracks how many unreleased grants of the lock have been made to a thread as a writer.

64. The lock object of claim 63 wherein the reader nest level for each thread is maintained at storage local to each thread.

65. The lock object of claim 63 wherein the lock object further comprises:

a callable method for upgrading a lock grant from reader to writer, wherein the callable method for upgrading the lock provides an indication of whether a writer intervened before the lock grant was upgraded to writer; and a callable method for downgrading the lock from writer to reader, wherein the callable method for downgrading the lock provides an indication of whether a writer intervened before the lock grant was downgraded to reader.

66. In a computer system, a synchronization service for protecting at least one protected resource, the synchronization service comprising:

means for tracking how many executing entities currently have outstanding granted requests to protect the at least one resource during a read operation;

means for initiating an interlocked operation on the means for tracking how many executing entities currently have outstanding requests during a read operation to grant a request for protection for a read operation;

means for tracking whether there is an outstanding granted request to protect the at least one resource during a modify operation; and means for initiating an interlocked operation on the means for tracking whether there is an outstanding granted request to protect the at least one resource during a modify operation to grant a request for protection for a modify operation.

67. The synchronization service of claim 66 further comprising:

means for tracking how many outstanding requests for protection during a read operation have been granted to an executing entity, wherein said means is accessible in storage local to the executing entity.

68. A computer-readable medium comprising a lock data structure representing a reader/writer lock, the lock data structure comprising the following fields:

a waiting readers field indicating how many readers are waiting to acquire the reader/writer lock;

a waiting writers field indicating how many writers are waiting to acquire the reader/writer lock;

a reader event field referencing an execution suspension mechanism on which at least one of the readers out of the readers waiting to acquire the reader/writer lock is waiting; and a writer event field referencing an execution suspension mechanism on which at least one of the writers out of the writers waiting to acquire the reader/writer lock is waiting.

69. The computer-readable medium of claim 68, the data structure further comprising:

a readers field indicating how many readers currently hold the lock, wherein the readers field is situated at a least significant portion of a unit of memory.

70. The computer-readable medium of claim 68 wherein the reader/writer lock supports time outs, the data structure further comprising:

a reader-signaled field indicating the lock is being passed to a reader waiting on the execution suspension mechanism on at least one of the readers out of the readers waiting to acquire the reader/writer lock is waiting; and a writer-signaled field indicating the lock is being passed to a writer waiting on the execution suspension mechanism on which at least one of the writers out of the writers waiting to acquire the reader/writer lock is waiting.

71. The computer-readable medium of claim 68 wherein the data structure further comprises:

a writer nesting level indicating how many unreleased lock requests have been granted to a writer.

72. The computer-readable medium of claim 68 wherein the data structure further comprises:

a reader nesting level indicating how many unreleased lock requests have been granted to a reader.

73. The computer-readable medium of claim 72 wherein the reader nesting level is stored at a location local to the reader.

\* \* \* \* \*

UNITED STATES PATENT AND TRADEMARK OFFICE
CERTIFICATE OF CORRECTION

PATENT NO. : 6,546,443 B1
DATED : April 8, 2003
INVENTOR(S) : Kakivaya et al.

It is certified that error appears in the above-identified patent and that said Letters Patent is hereby corrected as shown below:

Title Page, Item [54] and Column 1, line 1,
"READER-WRITER" should read -- READER/WRITER --.

Title Page,
Item [56], OTHER PUBLICATIONS, before "Multithreading: When to Use the Synchronization Classes," MSDN CD-ROM, Microsoft Corporation, pp. 1-2, Apr. 1998," the following reference should appear:
-- "Multithreading: How to Use the Synchronization Classes," CD-ROM, Microsoft Corporation, p. 1, Apr. 1998. --
("Class reentrant. . ."), "WritePreferenceReadWriteLock" should read
-- WriterPreferenceReadWriteLock --.

Column 1,
Line 4, before the first paragraph, the following should appear:
-- COPYRIGHT AUTHORIZATION
    A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING APPENDIX --

Column 6,
Line 23, "modern" should read -- modem --

Column 9,
Line 47, "AcquireReaderLocko( )" should read -- AcquireReaderLock( ) --

Column 13,
Line 45, "-time" should read -- time --

Column 16,
Line 23, "charged" should read -- changed --
Line 49, "prograrmmers" should read -- programmers --

Column 18,
Line 45, "to the another" should read -- to another --

UNITED STATES PATENT AND TRADEMARK OFFICE
CERTIFICATE OF CORRECTION

PATENT NO. : 6,546,443 B1
DATED : April 8, 2003
INVENTOR(S) : Kakivaya et al.

It is certified that error appears in the above-identified patent and that said Letters Patent is hereby corrected as shown below:

Column 24,
Line 28, "reumed" should read -- resumed --
Line 46, "not-shown" should read -- not shown --
Line 56, "resurning" should read -- resuming --

Column 25,
Lines 19 and 48, "if" should read -- is --

Column 28,
Line 29, "after the receiving the" should read -- after receiving the --

Column 31,
Line 52, "executing-entity" should read -- executing entity --

Column 34,
Lines 3 and 6, "any of the of the plurality" should read -- any of the plurality --

Signed and Sealed this

Twenty-first Day of October, 2003

JAMES E. ROGAN
*Director of the United States Patent and Trademark Office*